(12) United States Patent
Novy

(10) Patent No.: US 7,669,138 B2
(45) Date of Patent: Feb. 23, 2010

(54) INTERACTING WITH A COMPUTER-BASED MANAGEMENT SYSTEM

(75) Inventor: Alon R. J. Novy, Maroubra (AU)

(73) Assignee: Liaise, Inc., Sunnyvale, CA (US)

( * ) Notice: Subject to any disclaimer, the term of this patent is extended or adjusted under 35 U.S.C. 154(b) by 431 days.

(21) Appl. No.: 11/553,594

(22) Filed: Oct. 27, 2006

(65) Prior Publication Data

US 2007/0100861 A1    May 3, 2007

Related U.S. Application Data

(60) Provisional application No. 60/731,997, filed on Oct. 31, 2005.

(51) Int. Cl.
*G06F 15/00* (2006.01)
*G06F 13/00* (2006.01)

(52) U.S. Cl. .................................. 715/763; 707/5

(58) Field of Classification Search ......... 715/763–765, 715/851–853, 840; 707/3, 5; 709/217, 219
See application file for complete search history.

(56) References Cited

U.S. PATENT DOCUMENTS

| | | | | |
|---|---|---|---|---|
| 5,208,748 | A | 5/1993 | Flores et al. ................. 364/419 |
| 5,216,603 | A | 6/1993 | Flores et al. ................. 364/419 |
| 5,265,014 | A | 11/1993 | Haddock et al. ........ 364/419.08 |
| 5,630,069 | A | 5/1997 | Flores et al. ................. 395/207 |
| 5,734,837 | A | 3/1998 | Flores et al. ................. 395/207 |
| 6,026,410 | A | 2/2000 | Allen et al. .............. 707/104.1 |
| 6,029,171 | A | 2/2000 | Smiga et al. ................. 707/102 |
| 6,058,413 | A | 5/2000 | Flores et al. ................. 709/101 |
| 6,073,109 | A | 6/2000 | Flores et al. .................... 705/8 |
| 6,421,678 | B2 | 7/2002 | Smiga et al. ................. 707/102 |
| 6,622,147 | B1 | 9/2003 | Smiga et al. ................. 707/102 |
| 6,714,939 | B2 | 3/2004 | Saldanha et al. ............. 707/102 |
| 6,799,718 | B2 | 10/2004 | Chan et al. .................... 235/375 |
| 6,973,332 | B2 | 12/2005 | Mirkin et al. ............... 455/566 |
| 7,146,381 | B1 | 12/2006 | Allen et al. .............. 707/104.1 |
| 2004/0199498 | A1 | 10/2004 | Kapur et al. .................... 707/3 |
| 2004/0267574 | A1 | 12/2004 | Stefanchik et al. ............. 705/2 |
| 2005/0076037 | A1* | 4/2005 | Shen ......................... 707/100 |
| 2008/0005265 | A1* | 1/2008 | Miettinen et al. ........... 709/217 |

FOREIGN PATENT DOCUMENTS

EP    1577797 A2    9/2005

(Continued)

OTHER PUBLICATIONS

A search report for related PCT Application PCT/AU2006/001599, mailed on Jan. 29, 2007.

(Continued)

*Primary Examiner*—Cao (Kevin) Nguyen
(74) *Attorney, Agent, or Firm*—Dov Rosenfeld; Inventek

(57) ABSTRACT

A method, and apparatus, and a software product for implementing a method for interacting with a computer-based management system including authoring and communicating composite data messages, each composite data message comprising both free-text and structured data, such that the structured data represents the intended meaning of the free-text in a form understandable by the computer-based management system. In one version, authoring includes converting free-text to structured data. One version includes communicating the composite message.

33 Claims, 13 Drawing Sheets

FOREIGN PATENT DOCUMENTS

| | | |
|---|---|---|
| WO | WO 98/37478 A2 | 8/1998 |
| WO | WO 99/07118 A1 | 2/1999 |

OTHER PUBLICATIONS

M. Dymetman, A. Max and K. Yamada, "Towards Interactive Text Understanding," Xerox Research Centre Europe, Grenoble, downloaded Jul. 15, 2006 from ac1.1dc.upenn.edu/P/P03/P03-2017.pdf.

U. Hahn, M. Romacker and S. Schulz, "Medsyndikate: Design Considerations for an Ontology-Based Medical Text Understanding System," 2000, J. Marc Overhage (ed.) Proceedings of the AMIA Annual Symposium, 330-4.

J.R. Hobbs, D. Appelt, J. Bear, D. Israel, M. Kameyama, M. Stickel and M. Tyson, "FASTUS: A Cascaded Finite-State Transducer for Extracting Information form Natural-Language Text," 1996, In Finite State Devices for Natural Language Processing, MIT Press, Cambridge, MA.

R. Weischedel, D. Ayuso, S. Boisen, H. Fox and R. Ingria, "A New Approach to Text Understanding," In Proc. of Speech and Natural Language Workshop. N.Y. 1992.

R.K. Taira, S.G. Soderland and R.M. Jakobovits, "Automatic Structuring of Radiology Free-Text Reports," Radiology Society of North America, Annual Meeting, 1999.

U. Sinha, B. Dai, D.B. Johnson, R. Taira, J. Dionisio, G. Tashima, M. Golamco and H. Kangarloo, "Computers in Radiology," American Roentgen Ray Society, AJR:175, Sep. 2000.

S.G. Soderland, "Building a Machine Learning Based Text Understanding System," In workshop notes, Adaptive Text Extraction and Mining (ATEM-2001) at Seventeenth International Joint Conference on Artificial Intelligence (IJCAI-2001), 2001.

A search report for related PCT Application PCT/AU2006/001599, mailed on Jan. 29, 2007.

PCT International Preliminary Report on Patentability on PCT Application PCT/AU2006/001599.

* cited by examiner

```
For each data object in composite data message:

If type = 'Task' or type = 'Project' then
      Assign Project Management System as target
      Assign Billing System as target
      Assign Calendaring System as target
   Else if type = 'Issue' then
      Assign identifying information for Issues Management System
   Else if type = 'Risk' then
      Assign identifying information Risk Management System
   End if End For
```

FIG. 5

```
Group data objects by their respective target management systems
For each target management system:
   Select drivers for management system
   Connect to management system using drivers
   For each data object in composite data message:
      Find corresponding data objects in management system
      If corresponding data objects does not exist in management system
         Add corresponding data objects in management system
         Retain reference to data object in management system
      Else
         Update corresponding data objects in management system
      End if
   End For
   Resolve references for data objects
   Disconnect from management system
End For
```

FIG. 6

```xml
<task>
    <id>3</id>
    <GUID>00000010-0000-0010-8000-00AA006D2EA4</id>
    <name>Complete Design Document</name>
    <description>Complete all sections of document template</description>
    <start>1/1/2006</start>
    <due>1/5/2006</due>
    <status>open</status>
    <complete>15%</complete>
    <references>
        <reference>
            <self>
                <sources>
                    <source id="">http://server1/CRM/ProjectPlan.mpp</source>
                </sources>
            </self>
        </reference>
        <reference>
            <person>
                <sources><source id="1233" table="tblPeople">HRDB</source></sources>
                <name>Jane Citizen</name>
                <task_role>Owner</task_role>
                <mail>jsmith@example.com</mail>
            </person>
        </reference>
        <reference>
            <project>
                <sources>
                    <source id="80">http://server1/CRM/ProjectPlan.mpp</source>
                    <source id="INT441">Billing</source>
                </sources>
                <name>Our New CRM System</name>
            </project>
        </reference>
        <reference>
            <predecessor>
                <sources><source id="2"/></source_id>
                <name>Complete Scope Document</name>
            </predecessor>
        </reference>
    </references>
</task>
```

FIG. 8

```
<?xml version="1.0"?>
<message>
<freetext>
Hi John

Can you please complete the design document by Tuesday?

Thank you
Jenny
</freetext>
<data>
    <tasks>
        <task>
            <id>3</id>
            <GUID>00000010-0000-0010-8000-00AA006D2EA4</id>
            <description>
                    Can you please complete the design document by Tuesday?
            </description>
            <start>1/1/2006</start>
            <due>1/5/2006</due>
            ...
        </task>
    </tasks>
</data>
```

FIG. 9

INTERACTING WITH A COMPUTER-BASED MANAGEMENT SYSTEM

RELATED APPLICATION(S)

The present invention claims benefit of priority of, and is a conversion of U.S. Provisional Patent Application No. 60/731,997 to inventor Novy filed Oct. 31, 2005 and titled METHOD AND APPARATUS FOR INTERACTING WITH MANAGEMENT SYSTEMS. The contents of such U.S. Application No. 60/731,997 are incorporated herein by reference.

FIELD OF THE INVENTION

This invention relates to computer-based management systems and more particularly to a computer-implemented method and apparatus for interacting with computer-based management systems.

BACKGROUND

For the purpose of the description herein, the term "computer-based management system" is used to refer to a computer-implemented method operating on a processing system. The method is for assisting the management of human collaborative undertakings, and uses at least one of a user interface for a human user (the "user interface"), a collection of behaviors, a data store and/or a collection of one or more interfaces (APIs) for programmatically accessing the computer-based management system.

Today, there exists a wide variety of computer-based management systems for assisting the management of human collaborative undertakings, such undertakings including one-off (i.e., once only) activities, groups of activities, e.g., projects and subprojects, as well as repeating and business-as-usual activities. Typically, such a computer-based management system provides for storing, retrieving and manipulating at least one pre-determined type of data, e.g., a data object type for a task. One example of a computer-based management system is a computer-based project management system.

Some typical applications for computer-based management systems include but are not restricted to:

Planning projects, e.g., planning work breakdown structures and individual activities.

Tracking actual performance and comparing that performance with a plan, e.g., the original plan.

Reporting and highlighting deviation of actual performance from the original plan.

Scheduling the use of human and material resources.

Recording costs and time spent on individual activities and projects.

Creating high-level overviews of current status and progress.

The functions carried out by a computer-based management system are sometimes called behaviors. As used herein, a behavior of a computer-based management system is one of:

Storing, retrieving and/or manipulating data related to at least one human undertaking, e.g., data representing real-world activities, risks and issues.

Displaying such data; generating reports, e.g., for on-screen display and for printing; analyzing data stored by the computer-based management system, e.g., performance assessments for individual employees.

Providing additional support for typical management activities, including, for example, one or more of: project schedule planning, e.g., by providing for automated Gantt chart or other planning chart creation; resource scheduling; budgeting; work breakdown structure creating; workflow automation; progress reporting; automated dashboard views; reporting; monitoring standards compliance, and so forth.

For the purpose of the description herein, by a computer-based management system being able to "handle" data of a data object type is meant that the computer-based management system is able to store, retrieve, and/or manipulate that type of data. Typically, the types of data handled by a given computer-based management system are pre-determined. In some cases, the computer-based management system also is configurable to handle additional data object types. Some examples of data object types handled by computer-based management systems include tasks, projects, subprojects, phases, project portfolios, risks, issues, decisions, resolutions, meeting minutes, notes, timesheet entries, budgets, and so forth.

Those skilled in the art will appreciate that computer-based management systems typically store and manipulate data in a structured data format. Such data in structured data format (the "structured data") includes discrete data objects of known type. Each data object has one or more associated data structures that includes at least one discrete data field of known type, each data field able to contain a value. For example, a data object of type "Project" has an associated data structure that includes a name data field that is a fixed-width string, a start date data field, an end date data field, and a description data field that is a free-text data field. Furthermore, some computer-based management systems provide for data objects referencing other data objects. For example, a task data object references a project data object, which may be used to indicate that the referring task belongs to the referenced project.

Therefore, as used herein, "structured data" refers to data that can be input, stored, retrieved, and/or manipulated by a computer-based management system.

As one example, consider a computer-based management system that stores data in a relational database. The handled data in this example computer-based management system is stored as records in tables, and references between data objects are stored as foreign keys. In such an example, a structured data object has at least one record for a table for use in a relational database. One example of providing data for a structured data object is filling in a form, the filling of the form providing one or more fields of the associated data structure(s), e.g., of a record meant for a table.

As another example, a computer-based management system might store data in an XML file, including storing the handled data as XML elements, storing the data fields as element attributes, and storing the references using element nesting.

Those skilled in the art will appreciate that there are many forms possible for storing data handled by computer-based management systems. Furthermore, those skilled in the art will appreciate that in some computer-based management systems data is presented to the user as a single conceptual data object, but is stored as one or more data structures in the data store of the computer-based management system. For the purpose of the description herein, unless explicitly otherwise indicated, the term "data object" or "structured data object" always refers to a conceptual data object, e.g., a task, or an issue, and associated with each such data object are one or more physical data structures that a specific computer-based management system uses to store and manipulate the data of the data object. The one or more physical data structures are collectively called the structured data of the data object. Structured data may refer to more than one data object; such structured data is referred to as the structured data corresponding to the more than one data objects.

In addition to handling data, some computer-based management systems provide other support for management activities, including, for example, project schedule planning, e.g., by providing automated Gantt chart creation, resource scheduling, budgeting, work breakdown structure creating, workflow automation, progress reporting, automated dashboard views, and reporting and monitoring standards of compliance.

Embodiments of such systems range from a simple document template, e.g., a spreadsheet for entering all current risks according to the pre-determined structure of the spreadsheet, to sophisticated, purpose-built programs, e.g., Primavera Project Planner by Primavera Systems, Inc., and Microsoft Project (TM). Those skilled in the art will appreciate that a single organization might operate many such computer-based management systems, each computer-based management system for assisting a different aspect of managing the organization's activities in accordance with the standards and rules of the organization.

Typically, users interact with a computer-based management system by directly accessing a user interface provided by the computer-based management system. A typical user interface might include at least one fillable "form," the form having a pre-determined collection of controls for at least one of: viewing data, editing data, triggering a behavior, and/or navigating to other forms. Those skilled in the art will appreciate that in many cases the data controls of a form are largely determined by the structure of the structured data format (the "schema") used by the data store.

Furthermore, some computer-based management systems permit other software products to interact by means of an application programming interface ("API"), the API providing for programmatic access to at least one of behavior and data included in the computer-based management system. Typically, programmatic access to data requires the use of a structured data format, i.e. a schema, and typically that schema is also based on the schema used by the data store of the computer-based management system.

Those skilled in the art will appreciate that the use of structured data in computer-based management systems provides several important advantages over simply storing a collection of free-text documents, including simplifying the automated interpretation and understanding of the data, simplifying the code for handling the data, improving the speed and efficiency of data handling, and providing for simpler reporting and summarization of the data.

A typical interaction with such a computer-based management system is shown in simplified conceptual form in FIG. 1. In this embodiment the computer-based management system includes a management program 120 that implements a user interface, the behaviors, and the API of the computer-based management system, and a database 110 for the data store of the computer-based management system.

A user acting as author 150, e.g., a manager creating a new task and allocating that task to an employee, creates a new data object, e.g., the task, by interacting with the user interface provided by the management program 120. The interacting requires the user to navigate to the correct form for entering data field values for the new data object. As an example, the user interface might provide a New Tasks Form.

Once the user enters the data in the appropriate form, the management program 120 stores the information in the database 110.

Consider another user acting as a recipient 160, e.g., as the employee to whom the new task has been allocated. Such a recipient 160 interacts with the user interface of the management program 120 to request information. In this example, the employee requests to see all tasks allocated to him/her.

In many cases, users will at times act as authors and at other times act as recipients. In some cases, the author of a data object is also one of the eventual recipients of information he/she has created, e.g., a manager creates a new task and retrieves that task at a later time.

FIG. 4 illustrates this same typical interaction in Gane-Sarson data flow diagram notation.

As is evident in the above example, typical computer-based management systems force an indirect communication between the author and the intended recipients of that information. Both the author and the eventual recipients of that information feel they are interacting with the computer-based management system rather than interacting directly with each other.

In some cases, possibly in many cases, users will feel that it is better or even necessary to communicate important information directly, even if that information has been entered into a computer-based management system. For example, a manager allocating an important task to an employee might enter the task into the computer-based management system, but also sends an email to the employee in order to communicate the information directly. In this example case, the manager is effectively forced to create the data twice—once entering it into the computer-based management system and again writing it in an email.

To overcome this problem, some computer-based management systems automate the sending of an email to users who are intended recipients of some information in the computer-based management system. For example, Microsoft Project Server™ automates the sending of emails for the purpose of notifying users that changes have been made to the tasks of a project, and for the purpose of alerting users of upcoming and overdue events for which they are responsible.

However, as will be appreciated by those skilled in the art, automated emails lack the sense of immediacy and direct interpersonal communication of an email sent directly from one user to another.

Furthermore, since automated emails are typically created according to a very limited set of templates, each automated email will look very similar to other automated emails created from the same template. Thus, automated emails tend to be less effective at securing the appropriate level of attention from a recipient than emails created by a human. In some cases, possibly in many cases, users begin to anticipate that the automated emails will fail to have the desired effect on recipients, and will therefore choose to manually author additional emails to achieve the desired level of communication. In such situations, not only are authors of data duplicating their efforts in authoring data, but recipients receive multiple emails in relation to the same information. Users already struggling with managing the contents of growing email inboxes are additionally burdened with having to deal with redundant emails.

Those skilled in the art will appreciate that in some cases, possibly in many cases, users limit their use of computer-based management systems over time, and in some cases, users might cease regular use of the computer-based management system altogether.

On the other hand, the free-text format of email permits users to select for each email the most appropriate structure, content, wording, and layout for the purpose of communicating the data to the specific intended recipient(s). However, since prior art computer-based management systems typically require structured data, and emails include free-text, the use of emails as a source of data for use in computer-based management systems is typically limited to treating the entire email as a single data object. For example, Problem Tracker™ by Net Results Corporation, Palo Alto, Calif., treats any received email as a single issue. Those skilled in the art will appreciate that often emails will include data that, when converted to structured data, would actually result in multiple data objects, possibly of varying types, and possibly handled by multiple disjoint computer-based management systems. Thus, treating an email as a single data object is not sufficient in many cases, and places severe constraints on a user's freedom to select the content of the email.

Thus, there is a need in the art for a method of interacting with a computer-based management system, including creating, editing, or deleting structured data in the computer-based management system, the method also including communicating the data to any intended human recipient(s) in the form of a free-text message.

Furthermore, users of a computer-based management system must learn how to interact with that specific computer-based management system prior to effective use. The more feature-rich the computer-based management system, the longer and difficult the learning period is likely to be.

In an organization where multiple computer-based management systems are in use, e.g., where separate project, risk, and issue computer-based management systems are used, it is necessary for users to learn how to use and navigate multiple systems. Often, the method of interacting with a particular computer-based management system might differ significantly from the methods for other computer-based management systems, further lengthening the amount of time required for users to become effective.

Thus there exists a need in the art to standardize the method of interacting with computer-based management systems.

Furthermore, known methods for interacting with computer-based management systems typically require more effort, discipline and planning from users than communicating the same data by email. For example, a manager is writing an email to an employee to inform the employee of a new task allocation. The manager further includes in that email a list of the risks involved with the task, as well as an unrelated issue the employee is to resolve. Creating this type of information in many computer-based management systems would have required the manager to navigate to and use a form for creating tasks, a form for creating risks, a mechanism for linking risks to tasks, and a form for creating issues.

Some methods for interacting with computer-based management systems exist where structured data is created and emailed directly to the intended recipients. For example, Lotus Notes™ allows the creation of Notes Documents that can be emailed to other users as well as stored on a server. Microsoft Outlook™ allows the creation of Tasks and Meeting Invitations that can be emailed to other users.

In such methods the email client program provides the users with forms akin to the forms used in computer-based management systems, and further allows the information created in such forms to be emailed. The forms typically contain at least one data field of known type, where that type may be free-text. As with forms in computer-based management systems, users must create information according to the design of the form. Thus, such methods for interacting place the same restrictions on users with respect to the manner in which information can be created.

Those skilled in the art will appreciate that the lack of constraints, speed-of-use and ease-of use afforded by free-text methods typically cause users to prefer using those free-text methods, e.g., email, to interact via structured forms with computer-based management systems, and further, that in most organizations the use of email far outweighs the use of computer-based management systems.

Ideally, a new method is needed that exploits the popularity and advantages of email, that avoids necessitating a plurality of learning periods for a plurality of computer-based management systems, and that avoids the problems associated with automated emails generated from templates.

Thus, there exists a need in the art for a method for interacting with a computer-based management system, where the information is authored as free-text and converted to structured data for use by the computer-based management system, and where the free-text is then communicated directly to any intended recipients.

Furthermore, there is a need for the converting of free-text to structured data to be computer assisted, and not to require the user to manually author both the free-text and the equivalent structured data.

Those skilled in the art will appreciate that prior art methods for automatically converting free-text to structured data are typically complex to implement. Furthermore, owing to the complexity in correctly interpreting the ambiguities in natural language, in some cases, possibly in many cases, prior art methods for the automatic converting of free-text result in structured data that is not in accordance with the original intention of the author of the free-text.

Thus, there is a need in the art for a method for interacting with a computer-based management system, where information is authored as free-text and converted to structured data for use by the computer-based management system, and where the converting of free-text to structured data is simple to implement and reliably produces a result in accordance with the intentions of the author.

SUMMARY

Accordingly, embodiments of the invention provide several features.

One embodiment allows for interacting concurrently with at least one computer-based management system and with one or more users by authoring composite data messages, each composite data message including one or both of free-text and structured data, such that the structured data is interpretable by the computer-based management system(s).

One embodiment allows for authoring the composite data message by authoring the free-text of the message and converting the free-text progressively and incrementally to the corresponding structured data.

One embodiment provides for the structured data to be received by at least one computer-based management system.

One embodiment provides for the free-text to be received by the intended recipient(s).

One embodiment retains for the users the sensation that they are interacting directly with each other by exchanging free-text messages with each other.

Further features and advantages will become apparent from a consideration of the ensuing description and drawings.

Described herein is a method for interacting with computer-based management systems and a software product, e.g., on a computer readable carrier medium that includes instructions that when executed on a processing system implement the method.

To interact with the computer-based management system, users author composite data messages, each message comprising one or both free-text and, after conversion of the free-text, structured data, wherein the structured data represents the intended meaning(s) of the free-text. The conversion of free-text to structured data is done interactively with the author, in a progressive and incremental fashion during the authoring of the free-text message.

According to one embodiment, the free-text of the message is for receiving by human recipients, and the structured data is for receiving by at least one computer-based management system.

According to one embodiment, the free-text message is an electronic message, e.g., an email, instant message (IM), mobile phone text message (SMS), and/or other electronic message.

One particular embodiment includes a method comprising presenting a user interface to a user on a display device, accepting free-text from the user, converting the accepted free-text to form or modify structured message components related to the accepted free-text, and presenting to the user on a structured message user interface the structured data components related to the accepted free-text, such that the user can modify or accept the structured message components. The method further includes accepting from the user the user's modification and/or acceptance of the presented structured message components until structured message components related to the accepted—free-text are accepted. The method further includes repeating some or all of these steps until a composite message comprising both free-text and structured data is formed such that the structured data represents the intended meaning of the free-text in a form understandable by a computer-based management system. The method also includes electronically communicating the structured data of the composite message to at least one computer-based management system and, in the case that there is at least one human recipient, communicating at least the free-text of the composite message to the at least one human recipient.

One particular embodiment includes a method comprising receiving from a sending user at least the free-text part of a composite message that includes the free-text and structured data corresponding to the free-text, wherein the structured data represents the intended meaning of the free-text in a form understandable by a computer-based management system. The method includes accepting from a user an indication that the user desires to respond to the received composite message, and presenting to the user one or both of the free-text of the received composite message on a free-text user interface and/or the structured data of the composite message on a structured message user interface, such that the user can selectively modify one or both of the presented free-text and/or structured data to form a new composite message to send to one or more recipients. The received composite message includes structured data corresponding to a plurality of data objects not necessarily having the same data object type.

One particular embodiment includes a method comprising receiving from a sending user a free-text message, accepting from a user an indication that the user desires to respond to the received message, presenting to the user the free-text of the received message on a free-text user interface, and accepting at least some of the free-text from the user, the accepting including accepting modification and/or addition to the free-text. The method also includes converting the accepted free-text to form or modify structured message components related to the accepted free-text, presenting to the user on a structured message user interface the structured data components related to the accepted free-text, such that the user can modify or accept the structured message components, and accepting from the user the user's modification and/or acceptance of the presented structured message components until structured message components related to the accepted—free-text are accepted. The method further includes repeating some or all of the steps of accepting of at least some of the free-text, converting, presenting the structured data components, and accepting the user's modification and/or acceptance until a composite message comprising both free-text and structured data is formed such that the structured data represents the intended meaning of the free-text in a form understandable by a computer-based management system. The method further includes electronically communicating the structured data of the composite message to at least one computer-based management system and, in the case that there is at least one human recipient, communicating at least the free-text of the composite message to the at least one human recipient.

One particular embodiment includes a method comprising: selecting a first data object of a first data object type, the first data object represented in structured data in a computer-based management system that is storing the structured data; displaying data of the first data object to a user on a user interface that includes a text user interface; accepting free-text or a modification of free-text from the user; converting the accepted free-text to form or modify structured message components related to the accepted free-text; presenting to the user on a structured message user interface the structured data components related to the accepted free-text, such that the user can modify or accept the structured message components; and accepting from the user the user's modification and/or acceptance of the presented structured message components until structured message components related to the accepted—free-text are accepted. The method further includes repeating some or all of the steps of accepting at least some of the free-text, converting, presenting the structured data components, and accepting the user's modification and/or acceptance until a composite message comprising both free-text and structured data is formed such that the structured data represents the intended meaning of the free-text in a form understandable by a computer-based management system. The method further includes electronically communicating the structured data of the composite message to at least one computer-based management system and, in the case that there is at least one human recipient, communicating at least the free-text of the composite message to the at least one human recipient.

Different particular embodiments each include a computer-readable and tangible carrier medium on which are encoded instructions that when executed by one or more processors of a processing system are operable to carry out any of the method embodiments described herein.

Particular embodiments may provide all, some, or none of these aspects, features, or advantages. Particular embodiments may provide one or more other aspects, features, or advantages, one or more of which may be readily apparent to a person skilled in the art from the drawings, descriptions, and claims herein.

BRIEF DESCRIPTION OF THE DRAWINGS

FIG. 5 shows pseudo-code that illustrates how, in one embodiment, identifying information is generated for the data objects in a composite data message.

FIG. 6 shows pseudo-code that illustrates how, in one embodiment, the structured data of a composite data message are provided to their respective target computer-based management systems.

FIG. 8 shows a portion of the structured data of an example embodiment, wherein the structured data is stored in an example XML format.

FIG. 9 shows a portion of the message body of an example email, wherein the email message body includes a composite data message, the composite data message comprising both free-text and structured data.

DETAILED DESCRIPTION

Figure 1:
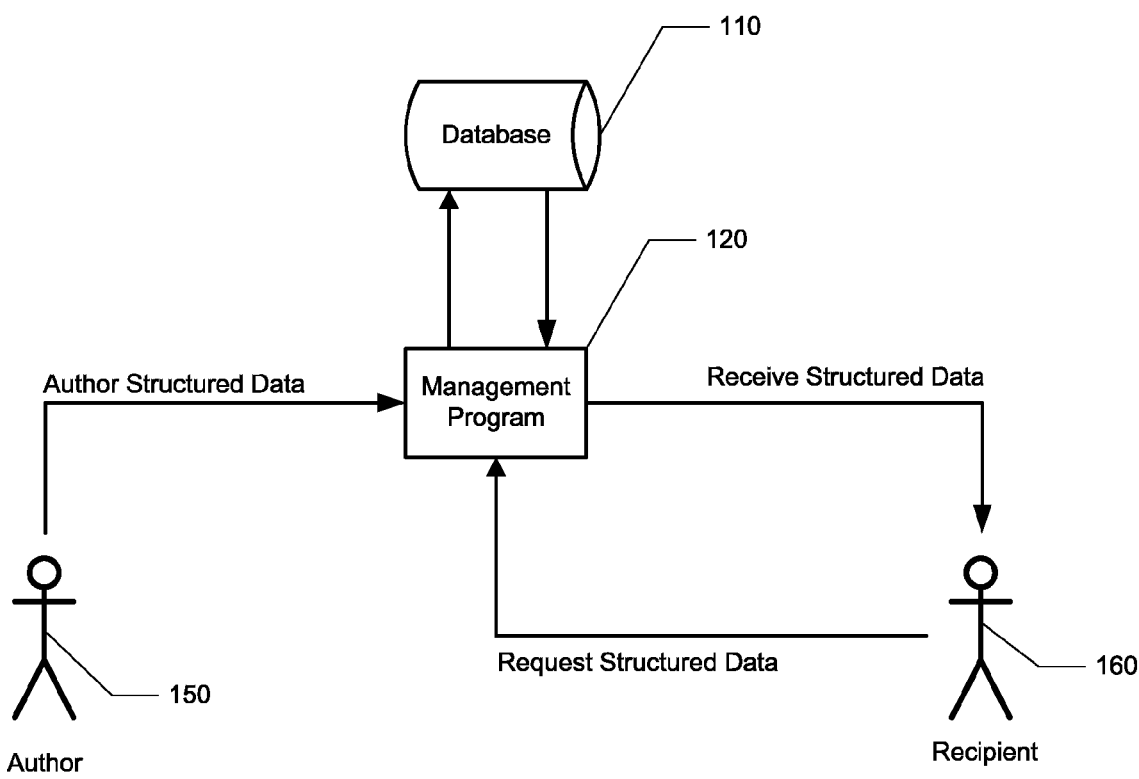
FIG. 1 illustrates a typical interaction with a computer-based management system according to a typical prior art method.

Described herein is a method for interacting with computer-based management systems and a software product, e.g., on a computer readable carrier medium that includes instructions that when executed on a processing system implement the method.

The user interacts with the computer-based management system by authoring messages, each message comprising one or both free-text and structured data. At least some of the free-text has meaning in the context of one or more computer-based management systems, that is, represent one or more data objects. Such one or more data objects, including any conceptual relationships between these objects are represented by the structured data. Thus, the structured data corresponds to one or more data objects that represent the meaning included in the free-text. The structured data of the message is communicated to the computer-based management system, and, in the case there is at least one human recipient for the free-text of the message, the free-text of the message is communicated to the at least one human recipient.

For the purpose of the description herein, the term "composite data message" will be used to refer to this type of message that includes both structured data and free-text data.

GLOSSARY OF TERMS

For the purpose of the present description, the following terms are used:

Free-text: Text that may or may not contain formatting mark up, but that need not be structured. Free-text, for example, is typically not organized into structured data objects.

Structured data: Data organized into one or more discrete structured data objects of known type and having data fields. In the context herein of communicating with a computer-based management system, the structure of the structured data is in a form understandable by the computer-based management system. Each data object in the structured data is represented in one or more data structures used by a particular computer-based management system to represent the data object(s).

Composite data message: A message for reception by at least one recipient for use in collaboration management, that message containing both free-text and structured data, wherein text fragments are mapped to fragment data objects.

Text fragment: A portion of free-text, e.g., a paragraph or a sentence. According to one embodiment, a text fragment includes one atomic unit of information for mapping to one structured data object.

Token: A single word or a number or a symbol or an unbroken sequence of symbols.

Structured data object: A conceptual unit of data organized into at least one data field and having a known type. Each object is represented in a particular computer-based management system by a set of data fields organized in one or more data structures of a particular type. An example is a data object that is represented as a record of data fields in a table of a known type in a relational database of a computer-based management system that uses the relational database.

Data object: see structured data object.

Type: A static definition specifying the structure for all structured data objects based on that type. Typically, each such definition includes specifications for at least one data field definition, and optionally includes: validation rules, behavior definitions, and relationship definitions. Those skilled in the art will appreciate that a type is equivalent to the "class" concept in object-oriented design.

Provisional: Refers the status of an entity, e.g., a type, a structured data object, or a data field, where the identity and/or data state of that entity has not been manually confirmed as correct by a human user.

Verified: Refers the status of an entity, e.g., a type, a structured data object, or a data field, where the identity and data state of that entity has been manually confirmed as correct by a human user.

Automatic: Refers to a property of an operation, the property being that the operation is performed by the apparatus.

Manual: Refers to a property of an operation, the property being that the operation is performed by a human user.

Authoring: The addition, modification and deletion of free-text fragments and structured data objects in a composite data message.

None or more: As is common in the art, in the description and claims, the term "none or more" for a quantity of elements means either none of the elements, or if there is or are elements, at least one element. It is used to indicate "optionally one or more."

Respond: It is to be understood that the verb "responding" to a message and the noun a "response" to a message encompass the commonly understood verbs "replying" to the message and "forwarding" the message, and the commonly understood nouns a "reply" to the message and a "forwarding" of the message. The replying is, for example, by sending a reply message to the sender of the message. The forwarding is, for example, by forwarding of the message by sending a message to nominated recipient(s), one of which may be the sender. Some user interfaces also may permit redirecting and/or resending a received message. The meaning of the verb "responding" is meant to encompass such actions. Note that some implementations permit for editing of a message that is being "re-sent" and/or "redirected."

Example Embodiments

Figure 2A:
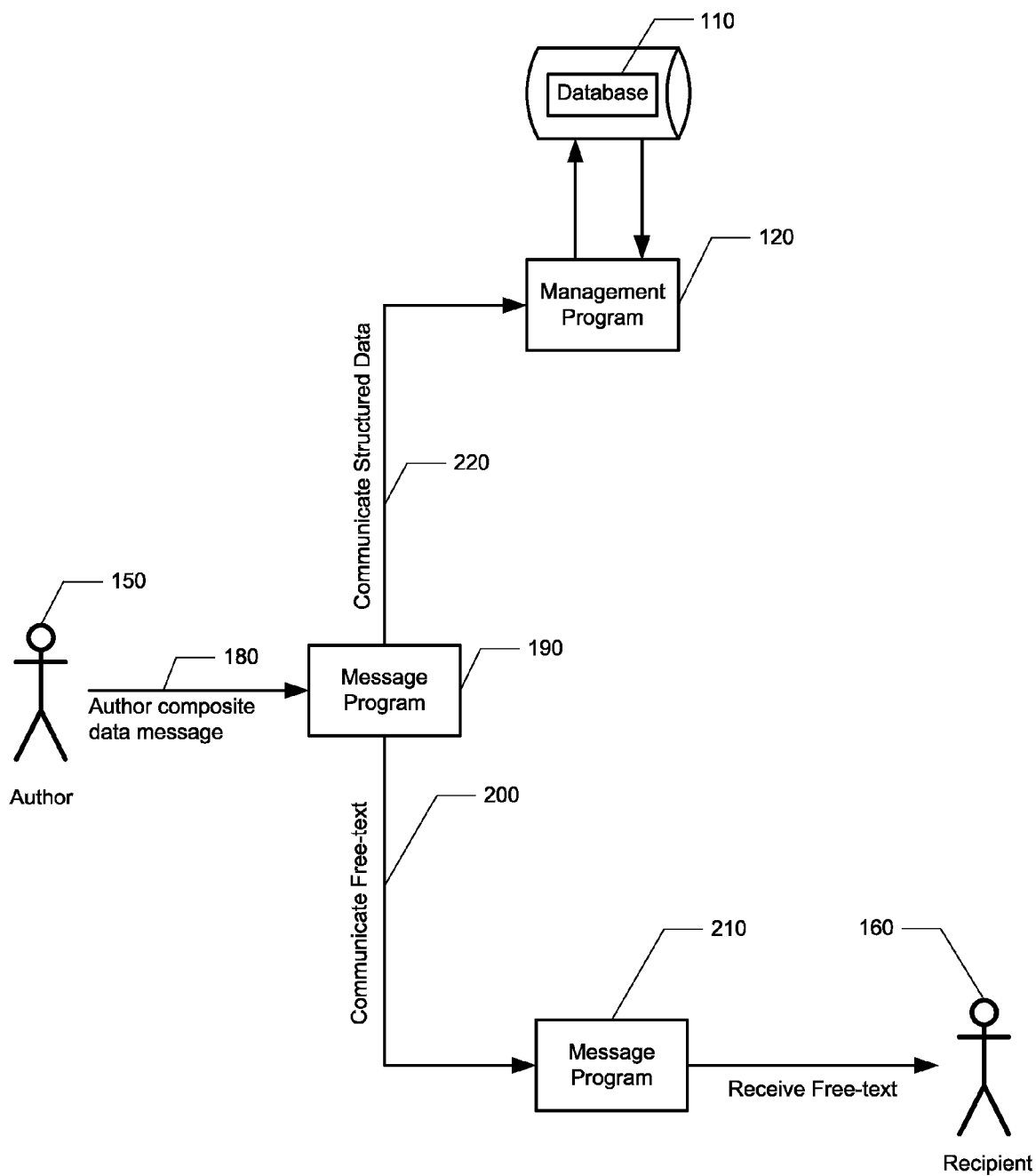
FIG. 2A illustrates a typical interaction with a computer-based management system according to one embodiment of the present invention.

FIG. 2A shows a high-level conceptual representation of interacting with a computer-based management system using one method embodiment of the present invention.

According to this embodiment, a computer-based management system includes a management program 120 that implements one or more of a user interface, behaviors and API of a computer-based management system, and a database 110 that implements a data store of the computer-based management system. Furthermore, according to this embodiment, a user acting as author 150 authors a composite data message 180 using a message program 190 executing on a processing system, e.g., an add-in installed in Microsoft Outlook™, where that add-in provides a method embodiment of the present invention.

In one embodiment, the message program 190 has knowledge of the API of the computer-based management system.

The first message program 190 communicates the structured data 220 of the composite data message to the management program 120. The management program 120 stores the structured data in the database 110.

According to one embodiment, the message program communicates the structured data to the management program by interacting with the API exposed by the management program. For example, the computer-based management system exposes an API using the Microsoft Distributed Component Object Model ("DCOM"), and the message program interacts with the DCOM objects of the API.

Furthermore, the message program 190 communicates the free-text 200 of the composite data message to a second message program 210.

According to one embodiment, the message program communicates the free-text of the composite data message to the other message program by sending the free-text as an ordinary electronic message, e.g., an email, instant message (IM), mobile phone text message (SMS), and/or other electronic message.

In one embodiment, the message program 190 and the message program 210 are the same program executing on different processor systems. According to another embodiment, the message program 190 and the message program 210 are the same program executing on the same processing system, but for example, used by different users at different times.

A user acting as recipient 160 receives the free-text of the composite data message by interacting with the message program 210. In one embodiment, the free-text is received as an electronic message, e.g., an email, instant message (IM), mobile phone text message (SMS), and/or other electronic message, and the message program 210 is the electronic message client used by the recipient.

Figure 2B:
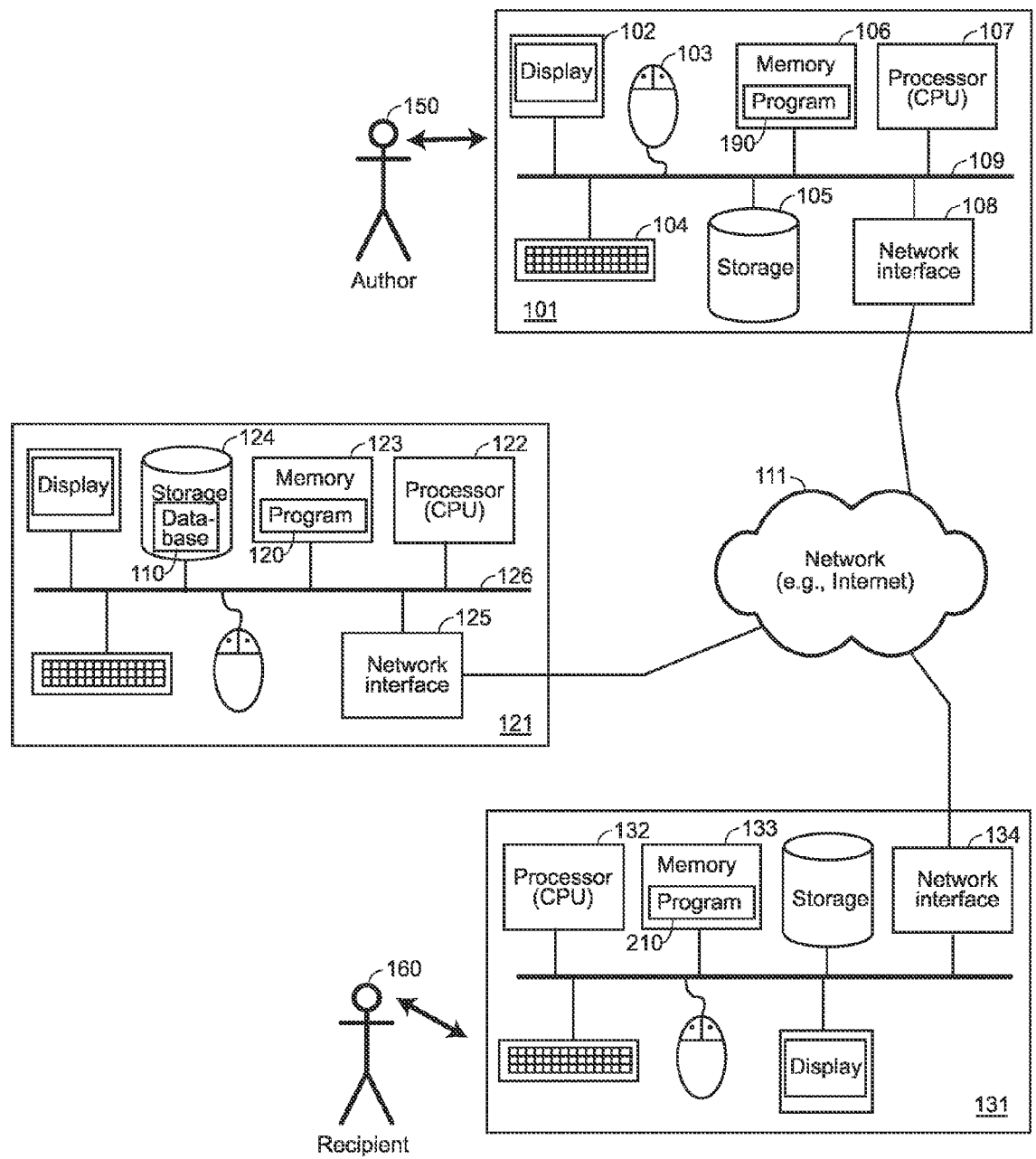
FIG. 2B illustrates a system in which the typical interaction of FIG. 2A takes place according to an embodiment of the present invention.

FIG. 2B shows an example system that implements the embodiment illustrated in FIG. 2A. The author 150 authors the composite data message by entering free-text on a user terminal 101. Those in the art will understand that a user terminal can take various forms, and the example user terminal 101 shown in FIG. 2B includes one or more processors, e.g., a CPU 107, memory subsystem 106, a keyboard 104, a mouse or other pointing device 103, a display device 102 such as a display screen, a storage subsystem, e.g., one or more disk drives 105, and other elements not shown. These elements are coupled by a bus system 109, shown, for simplicity, as a simple bus. Many elements and details are not shown so as not to obscure the inventive aspects. The message program 190 is shown in the memory 106. In the system shown, terminal 101 has a network interface 108 coupled to a network 111, which can be a private network, or the Internet, including a virtual private network over the Internet.

Each of the keyboard and the pointing device can be individually considered a user input device, as can the combination of the keyboard and the pointing device. Other embodiments of a user input device also are possible, e.g., voice input, pad input, and so forth.

The computer-based management system includes the management program 120 that in the example system is shown residing on and operable in a server 121 which in this example is remote to the user terminal 101, and coupled to the terminal 101 via the network 111. The server 121 is in one embodiment of a standard processing system that includes one or more processors, e.g., a CPU 122, a memory subsystem 123, a storage system 124 which contains the database 110, and other components, including a network interface 125, all coupled via a bus subsystem 126 shown for simplicity as a simple bus. The network interface is connected to the network 111.

FIG. 2B shows the server 121 including a user input device and a display screen. The management program includes the ability to display a user interface to a user via the display of the server 121. In one embodiment, the server 121 also can serve as a user interface remotely to a remote processing system, e.g., to user terminal 101 and/or user terminal 131 over the network 111.

The recipient 160 of the free-text message receives the free-text part of the composite message on another user terminal 131, e.g., as an electronic message, e.g., an email, instant message (IM), mobile phone text message (SMS), and/or other electronic message. Those in the art will understand that a user terminal can take various forms, and the example user terminal 131 shown in FIG. 2B includes one or more processors, e.g., a CPU 132, memory subsystem 133, a keyboard, a mouse or other pointing device, a display screen, a storage subsystem, e.g., one or more disk drives, and other elements not shown. These elements are coupled by a bus system shown, for simplicity as a simple bus. Many elements and details are not shown so as not to obscure the inventive aspects. The message program 210 is shown in the memory 133. In the system shown, terminal 131 has a network interface 134 coupled to the network 111.

While FIG. 2B shows the recipient, the author, and the server in which the management program is remote from each other and connected by a network, those in the art will appreciate that other arrangements are possible and fall within the scope of the present invention. For example, in one system, the database 110 and the processing system in which the management program 120 operates are remote to other elements, while other elements that are shown in FIG. 2B as remote and on different processors, can be co-located and even operate on the same processing system. The recipient, for example, can receive the free-text message on the same user terminal as was used to create the message, such receiving being at a later time than the creating of the message.

A Method of Authoring a Composite Data Message and Communicating the Message

Figure 3:
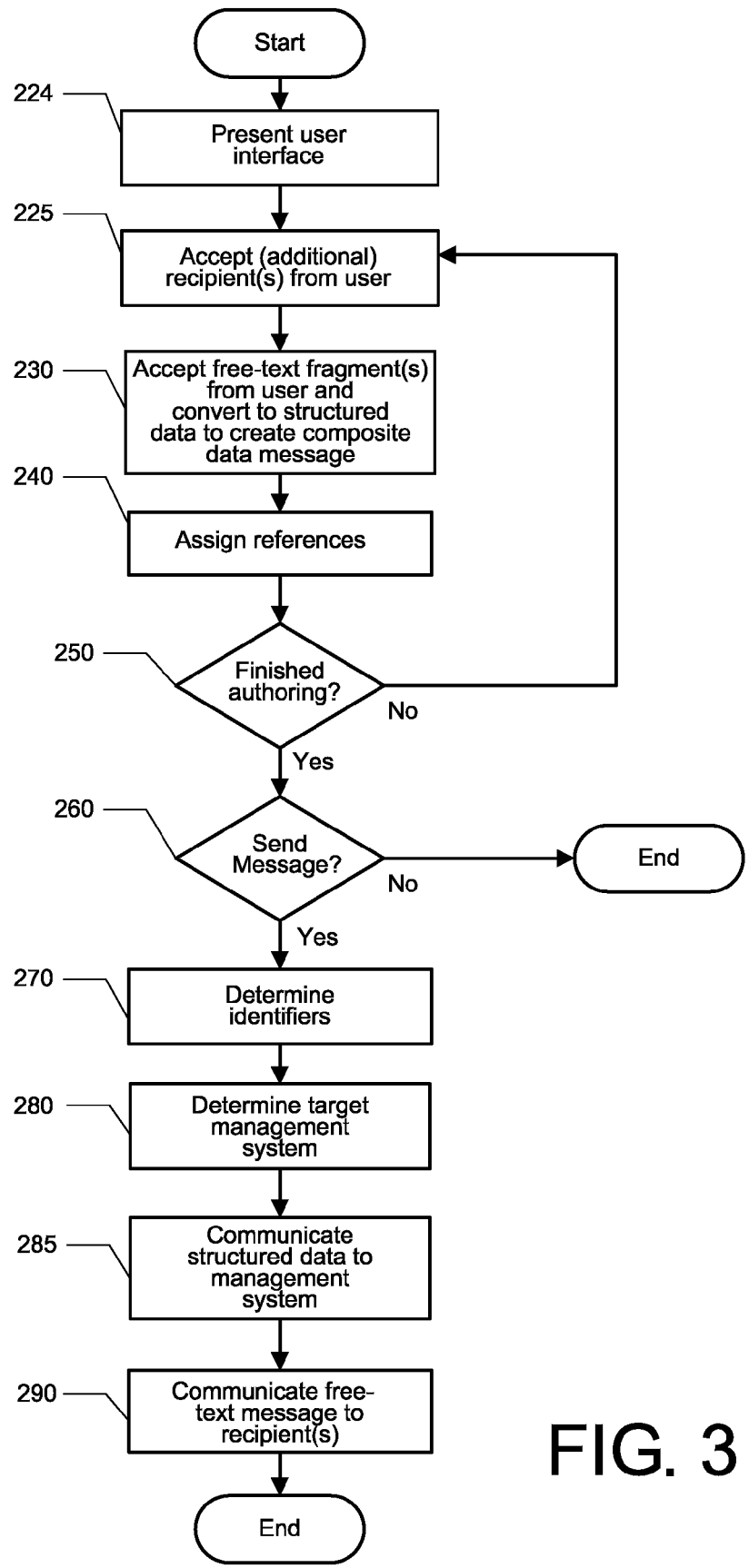
FIG. 3 shows a flowchart in simplified form for interacting with a computer-based management system in one embodiment of the present invention.
Figure 4:
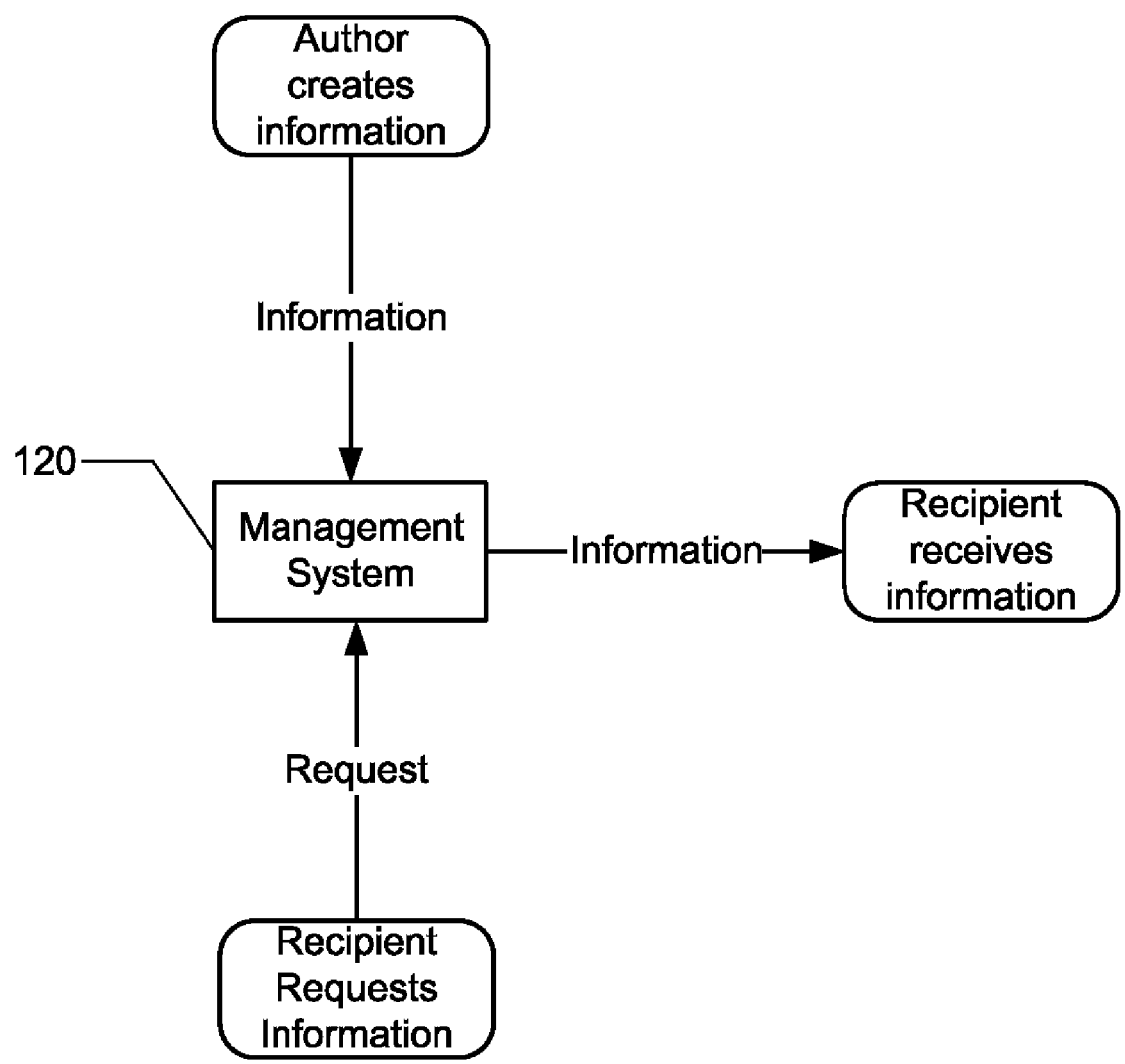
FIG. 4 shows a Gane-Sarson data flow diagram of a typical interaction with a computer-based management system according to a typical prior art method.

FIG. 3 is a simplified flowchart of one embodiment of the present invention. The operation shown is for a user acting as an author creating a new composite data message. The composite data message contains new information to be added to a computer-based management system that includes database 110. Suppose, for example, the author enters information about a new task, and also enters information about a new issue. The composite message includes free-text and, after conversion of the free-text, structured data that represents the intended meaning(s) of the free-text, and that is in a form understandable by the computer-based management system to be incorporated in database 110.

The method includes in 224 displaying a user interface to the user that enables the user to optionally nominate one or more human recipients for the free-text of the composite data message. In 225, the method accepts none or more indicators of human recipient(s), e.g., as provided by the user, or pre-defined from a previous received message. One example of an indicator is an email address, and/or other electronic message address, such as a contact name for an instant message, or a mobile phone number in the case of an mobile phone text message (SMS) so that 225 includes the method accepting electronic message addresse(s) of the human recipient(s), e.g., any user-provided electronic message addresses.

The method includes in 230 the user interactively providing and the method accepting free-text input in the form of one or more free-text fragments. The method in 230 also includes converting the accepted free-text fragment(s) to structured data to create a composite data message. The converting includes determining data object types and forming the data objects. Each object is stored in at least one associated data structure and may refer to other objects.

The method includes in 240 assigning references between specific data objects.

The method further includes in 250 determining if the user has finished authoring the composite data message, and if the user has not yet finished, returning to 225 to continue accepting more text fragment(s) and/or more recipients(s).

If the user has finished authoring the composite data message, the method ascertains in 260 whether the user intends for the message to (now) be sent. If yes, then in optional step 270, the method includes assigning identifiers usable by the computer-based management systems for referring to a specific data object in the composite data message.

In 280, the method includes determining for each data object of the composite data message, the at least one computer-based management systems to which that data object will be communicated. Typically, but not necessarily, there is only one computer-based management system, or the intended computer-based management system is clear from the context, in which case, 280 is skipped.

In 285 the method communicates the structured data of the composite data message to the target computer-based management system(s) to be accepted by the computer-based management system(s), the accepting including appropriately modifying the database(s) of the computer-based management system(s).

In 290, the method includes communicating the free-text of the composite data message to any human recipients nominated by the author of the message, e.g., as an electronic message, e.g., an email, instant message (IM), mobile phone text message (SMS), and/or other electronic message.

While the flowchart of FIG. 3 shows the sending of the structured data to the intended computer-based management system(s) separately and before the sending of the free-text message to any intended human recipient(s), no order of these steps should be inferred. For example, in different embodiments, the free-text part and structured data part can be sent simultaneously, or the structured data sent after the free-text data is sent.

Authoring the Message

The method includes in 230 the user interactively providing and the method accepting free-text input in the form of one or more free-text fragments. 230 further includes the method of converting the free-text fragment(s) to structured data to create a composite data message. In one embodiment, the user interface presented to the user in 224 includes provision for entering the free-text. In one embodiment, the converting to structured data is performed iteratively and incrementally by parsing the accepted free-text during authoring by the user. The conversion results in a provisional structured data state. For example, the author types a text fragment using the keyboard in the user terminal 101, e.g., types a paragraph. In one embodiment, the method has stored keywords that are indicative of data objects of particular types. For example, the "keywords" software" and "bug" are indicative of a data object of a type "Issue." The method includes parsing the accepted text-fragment and searching for keywords. In the case that one or more keywords are recognized that are indicative of a particular type, the method in 230 creates a provisional structured data state, including creating a data object of the particular type indicated by the recognized keyword(s). Suppose for example that an accepted text fragment in 230 includes the words "software" and "bug" that have been previously stored and that are indicative of the data object type "Issue." According to this example embodiment, the method creates a provisional structured data state, wherein a data object of type "Issue" is created, and the data fields of that data object are assigned initial values. For example, a data field for storing the issue category is assigned the value "Software Fault", and a data field for storing the name of the person responsible for resolving the issue is assigned the name of the first nominated recipient. Other data fields are initialized to their respective default states, e.g., assigned null values. In 230, the provisional data state is displayed to the user alongside the free-text while the user is authoring the free-text.

Furthermore, according to one embodiment, the step in 230 includes for incremental user verification and correction of such provisional structured data states. Thus, the author is able to confirm and, if necessary, correct the results produced by the automated conversion of free-text to structured data.

Once approved, the provisional designation is removed, the data state is assumed correct, and is no longer subject to automated changes.

According to one embodiment, in 230, further manual changes to previously approved constituents of the structured data are still possible. Further according to one embodiment, in 230, changes to a text fragment subsequent to the approval of the corresponding structured data revoke the approved status of the corresponding structured data.

According to one embodiment, in 230, the converting includes using: at least one schema; none or more message templates; none or more pre-determined life-cycles associated with a given data object type; and/or none or more pre-determined workflows for messages.

Further, according to one embodiment, the method in 230 includes displaying a visual model of the structured data of the message to the user.

One particular embodiment includes, in 230:

(a) accepting input indicative of a text fragment of the message;

(b) analyzing the accepted input to ascertain whether one or more predefined text conditions are met;

(c) in the case it is ascertained that one or more of the predefined conditions are met providing to a user output indicative of proposed structured data corresponding to the accepted input;

(d) accepting from the user additional input indicative of selective modification and/or approval of the proposed structured data; and (e) repeating steps (a) to (d) until all data indicative of all text fragments are accepted and analyzed.

In one embodiment, the text fragment is provided as free-text.

In one embodiment, the analyzing of (b) includes one or both of analyzing the accepted input corresponding to the text fragment, and analyzing the relationship of the text fragment to one or more previously accepted inputs corresponding to text fragments.

In one embodiment, the analyzing of (b) includes one or both of analyzing the accepted input corresponding to the text fragment, and analyzing the approved structured data corresponding to one or more previously accepted inputs corresponding to text fragments.

In one embodiment, one or more predefined text conditions is associated with one or more data object types, and the proposed structured data includes one or more of the data object types associated with the met text conditions.

One embodiment includes the step of providing a framework for the association of text conditions to data object types. One example is pre-defining a set of keywords and the data object types associated with the keywords.

One embodiment includes the step of automatically identifying one or more data object types associated with the met text conditions.

One embodiment includes the step of analyzing the one or more identified data object types for identifying a preferred selection of data object types.

In one embodiment, the preferred selection of data object types includes one or more or all of the identified data object types.

In one embodiment, analyzing the one or more identified data object types includes applying a selection protocol that is included in a mapping protocol for mapping between free-text and structured data.

In one embodiment, the mapping protocol includes a confidence level assessment. In one embodiment, the mapping protocol includes assessment of previously approved structured data. In one embodiment, the mapping protocol includes analysis of one or more attributes associated with the user. In one embodiment, the mapping protocol includes analysis of one or more attributes associated with one or more of the recipients. In one embodiment, the mapping protocol includes analysis of one or more relationship attributes relating to the user and one or more of the recipients. In one embodiment, the mapping protocol includes analysis of one or more attributes associated with a related message. In one embodiment, the mapping protocol includes analysis one or more attributes associated with one or more data object types. Furthermore, in one embodiment, the mapping protocol includes application of data derived by a learning algorithm.

In one embodiment, each data object type is indicative of one or more detail fields.

In one embodiment, the output indicative of proposed structured data provides one or more of the detail fields of which the data object types included in the proposed structured data are indicative.

In one embodiment, the providing of the additional input indicative of selective modification and/or approval of the proposed structured data includes editing and or approving information in the provided detail fields.

In one embodiment, one or more of the data fields are pre-determined to be a mandatory data field. Eventual transmission of the composite message is conditional and permitted only in the case that each of the provided mandatory detail fields is populated.

In one embodiment, at least one detail field is associated with one or more pre-determined validity conditions, e.g., the allowable type and allowable maximum length for data for populating the detail field. Eventual transmission of the composite message is conditional and permitted only in the case that all applicable validity conditions are met.

In one embodiment, one or more of the provided detail fields are automatically populated based on the analysis of the text.

In one embodiment, for each data object type the detail fields relate to aspects of that data object type.

In one embodiment, the detail fields include detail fields that relate to deadlines or other dates. In one embodiment, the detail fields include detail fields that relate to classifications. In one embodiment, the detail fields include detail fields that relate to resource allocations. In one embodiment, the detail fields include detail fields that relate to priority rankings. In one embodiment, the detail fields include detail fields that relate to responsibility allocations. Furthermore, in one embodiment, the detail fields include detail fields that relate to task acceptances or rejections.

In one embodiment, either or both of the detail fields and the data object type are provided in a graphical user interface as modifiable components.

In one embodiment, the step of providing a signal indicative of proposed structured data is performed upon one or more predetermined conditions being met.

In one embodiment, the one or more predetermined conditions include a user input. In one embodiment, the one or more predetermined conditions include input indicative of completion of receipt from the user input indicative of text. Furthermore, in one embodiment, the one or more predetermined conditions include input indicative of completion of receipt from the user input indicative of a discrete fragment of text.

In one embodiment, input indicative of a discrete segment of text includes input indicative of a paragraph of text.

In one embodiment, the text is displayed to the user by way of a graphical user interface in a free-text message field and the signal indicative of proposed structured data is provided in, on and/or adjacent the free-text message field.

In one embodiment, the signal includes a tree diagram indicative of the proposed structured text.

In one embodiment, the tree diagram is provided in a structured text preview field alongside the free-text message field.

In one embodiment, the signal includes one or more modifiable items periodically superimposed on the free-text message field.

In one embodiment, the one or more predetermined text conditions include the presence of one or more predetermined keywords. In one embodiment, the one or more predetermined text conditions include the presence of one or more predetermined grammatical structures. In one embodiment, the one or more predetermined text conditions include the presence of one or more predetermined text structures. Furthermore, in one embodiment, the one or more predetermined text conditions include the presence of one or more predetermined identifiers.

In one embodiment, one or more predetermined text structures include text structured to identify a date or other point in time.

In one embodiment, the one or more predetermined identifiers are indicative of one or more resources, items, projects, persons or locations.

In one embodiment, the message consists of a single text fragment.

In one embodiment, the user output indicative of proposed structured data corresponding to the accepted input that is provided to the user includes one or more modifiable components presented in a graphical user interface.

While those in the art will recognize that the above described details on embodiments of the method included in 230 to author the composite message are sufficient to implement and practice this composite-message authoring part of the invention, more details on some of the above-described embodiments are available in U.S. patent application Ser. No. 11/457,873 filed Jul. 17, 2006 to inventor Novy. The contents of U.S. patent application Ser. No. 11/457,873 are incorporated herein by reference.

REFERENCES

Referring back to FIG. 3, the method includes in 240 assigning references to specific data objects. For the purpose of the description herein, the term "referent" is used to describe a data object referred to by another data object. Such other data object being the "referrer." According to one embodiment, a data object can refer to none or more referents, and the reference is stored as part of the data structure of the referrer.

According to one embodiment, each referent is included in at least one of the structured data of the composite data message of the referrer, the structured data of another composite data message, and a management data system.

A typical example is a composite data message comprising a task data object. The task refers to the project to which the task belongs, where that project already exists as a data object in a computer-based management system. Another example is a composite data message comprising an issue object and a plurality of task objects, where the task objects are steps in the resolution of the issue, and thus, each of the resolution tasks refers to the issue to which it belongs.

Each reference includes sufficient information for identifying the location of the referent, e.g., a specific computer-based management system or a composite data message, for selecting the appropriate method for accessing the storage location, and for unambiguously locating the referent in that storage location. For example a task data object refers to a project, where the project is stored as a record in a relational database. In that case the reference includes the name of that relational database computer-based management system hosting the database, the name of the database, the name of the table storing the project record, and the primary key for locating the record in the table.

In one embodiment, each reference has a type, where the reference type is according to the relationship between the referrer and the referent. For example the reference type "Predecessor" is for references where the referrer and the referent are both task data objects, and the referent is a predecessor of the referrer. In addition, each data object type has a pre-determined set of assignable reference types, and each reference type has a pre-determined set of assignable data object types for use as referents. For example, one example embodiment allows task data objects to be assigned only references of type "Person", "Project", "Predecessor", "Successor", and "Self".

Furthermore, each reference includes none or more attributes, the attributes for describing the reference further. The attributes of a reference are determined by the reference type of the reference. For example, a reference of type predecessor has a predecessor type attribute with allowable values "Finish-to-Start", "Finish-to-Finish", "Start-to-Finish", and "Finish-to-Finish".

Figure 12:
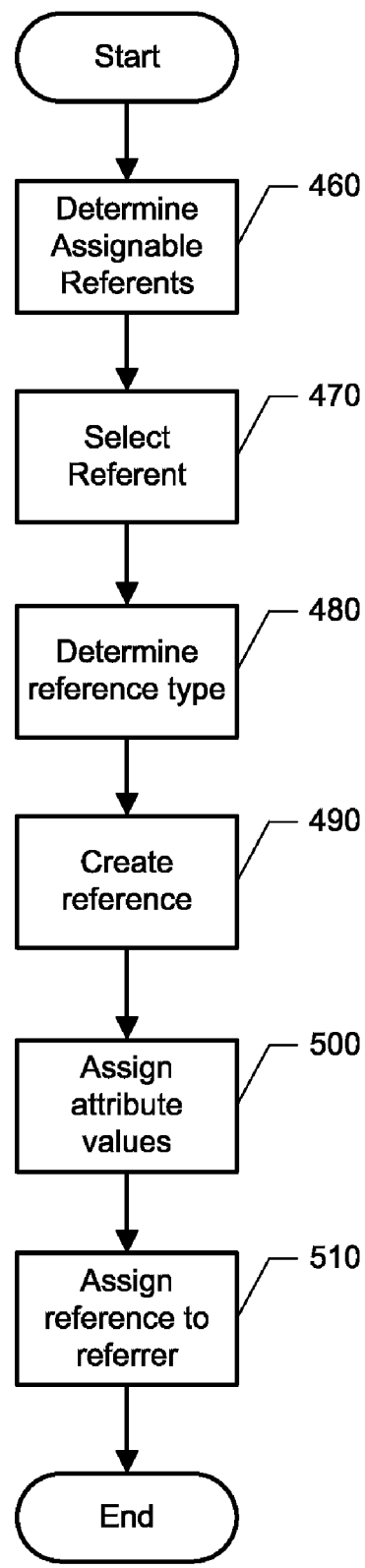
FIG. 12 shows a flowchart in simplified form for assigning references to data objects according to one method embodiment.

FIG. 12 shows a simplified flowchart of one embodiment of a method of assigning references included in step 240. The user interface presented to the author 150 includes a way for the user to indicate a request to assign a reference to a given data object, e.g., to a data object that is the referrer. One such user interface for operation with a two or more button pointing device, e.g., a two-button mouse, has provision for the user to right-click to show a menu of options, and one option is to assign a reference. Suppose that the author 150 has indicated a request to assign a reference to a given data object that is the referrer, and that the method has accepted the indication.

The embodiment in 240 includes in 460 determining a selection of assignable referents for the referrer data object. Determining the selection of assignable referents includes optionally determining one or more sources of assignable referents, and/or determining none or more criteria for selecting data objects from these selected sources, the selected objects being for inclusion in the selection of assignable referents.

Different embodiments include different determining criteria for selecting data objects for inclusion in the selection of assignable referents.

One embodiment includes the type of the referrer determining the type of data objects that are assignable referents for that referrer. That is, the type of the referrer determines the assignable reference types, and the assignable reference types determine the assignable referents.

One embodiment includes the current data state of a particular data object determining if that particular data object is an assignable referent. As an example, for a project, it may be that the data state of a project data object indicates that the project is closed, and therefore that project data object is no longer an assignable referent.

One embodiment includes the identity and access privileges of the author of the composite data determining if a given data object is an assignable referent. As an example, for a task, it may be that the author is not allowed to create new task data objects in a particular project.

According to one embodiment, determining sources of assignable referents includes selecting the composite data message being authored. In one embodiment, determining sources of assignable referents includes selecting any composite data message to which the composite data message is a direct or indirect response, e.g., a reply or a forward. In one embodiment, determining sources of assignable referents includes selecting any suitable computer-based management system, where that computer-based management system is considered suitable if, and only if, it handles at least one data object type that is an allowable referent type for the referrer.

Furthermore, in 470 the method includes providing for the author to select a referent from the selection of assignable referents. Providing for the selection of a referent includes displaying sufficient information about each referent to the author to allow the author to unambiguously determine the identity of the referent, e.g., the name and source of the referent, and providing for the author to indicate his/her selection, e.g., by a mouse-click.

In 480 the method includes determining the reference type of the new reference. According to one embodiment, determining the reference type includes determining which reference types are valid candidates. A reference type is a valid candidate if, and only if, according to the referrer's data object type a reference of that type is assignable to the referrer, and according to the reference type the referent is assignable to a reference of that reference type.

Furthermore, if there exists only one reference type that is a valid candidate, then the method in 480 includes automatically determining that this reference type is the reference type of the new reference. If there exists more than one candidate reference type the method includes in 480 providing for the author to manually select the intended reference type from a selection of the valid candidates.

The method includes in 490 creating a reference based on the reference type determined in 480, and assigning the data object selected in 470 as the referent of the new reference.

Furthermore, in 500, the method includes initializing reference attributes, each attribute according to its default value. Attributes without default values are initialized to null values.

The method also includes in 500 providing for the author to manually assign attribute values, including assigning new values to attributes that have been initialized to their respective default values.

The method includes in 510 assigning the new reference to the referrer.

Referring again to FIG. 3, in one embodiment, the step in 240 also includes assigning references globally to the composite data message, and assigning these references automatically to each data object in the composite data message, except where the type of the data object does not permit the adding of a specific reference type.

FIG. 8 illustrates a part of the structured data of a composite data message according to an example embodiment. According to this embodiment, the structured data of a composite data message is stored in XML format. Those skilled in the art will appreciate that there are many alternate formats for storing structured data, including other XML formats, or alternately, data tables of a relational database. For representing references, this embodiment uses a references element, that element comprising as child elements none or more reference elements. According to this example, each reference element includes one immediate child element (the "referent element"), e.g., the person element, and the name of the referent element identifies the data object type of the referent. Each referent element includes at least one source element, where each source element specifies the necessary information for locating the specific data structure(s) that store the relevant referent data object. Where the source element is an empty element, e.g., the predecessor element in FIG. 8, this means that the referent is itself located in the composite data message.

Furthermore, according to the example in FIG. 8, where a referent element includes a plurality of sources, this means that the referent exists in a plurality of storage locations. The additional child elements of a referent element provide information for use when authoring or displaying the composite data message. For example, a child element called task_role of the person referent element indicates the role the person has with respect to the task referring to that person.

Furthermore, according to the example of FIG. 8, each data object includes a self referent element, that element referencing that data object in the none or more computer-based management systems that also include the data object. For example, a task data object included in a composite data message has already previously been stored in a computer-based management system handling tasks. The task in the example of FIG. 8 includes a self-referent element, wherein the source is a Microsoft Project™ file. The ID attribute of the source has not yet been set, indicating that the data object is not yet stored in the file. This indicates that this Microsoft Project™ file is the target computer-based management system that is to receive that task on sending the composite data message.

Finishing the Authoring of the Composite Data Message

Referring again to FIG. 3, one embodiment of the method further includes in 250 determining if the user has finished authoring the composite data message, and if the user has not yet finished, returning to 225 to continue accepting more text fragment(s). The embodiment shown in FIG. 3 allows for adding more recipients, or a recipient if no recipients have been added. No ordering should be assumed. For example, 230 can occur before 225.

If the user has finished authoring the composite data message, the method then ascertains in 260 if the user intends to send the message. According to one embodiment, if the user does not intend to send the message, e.g., the user has simply closed the program, the method ends.

Data Object Identifiers

If the user does intend to send the message, the method includes in 270 determining and assigning identifiers. According to one embodiment, the step in 270 includes assigning a globally unique identifier (GUID), i.e., a randomly generated 128-bit value to each data object in the structured data of the message. According to another embodiment, the step in 270 further includes assigning a GUID to the composite data message. These identifiers are useful for referring to a specific data object in a specific composite data message, and can be communicated to computer-based management systems for use by the computer-based management system.

Furthermore, in one embodiment, data objects in composite data messages can refer to data objects in other composite data messages, e.g., by specifying the GUID of the composite data message comprising the referent, and the GUID of the referent itself.

According to yet another alternate embodiment, the step in 270 is not implemented.

Communicating with Computer-based Management Systems

The method includes in 280 determining for each data object of the composite data message, the at least one computer-based management systems to which that data object will be communicated. For the purpose of the description herein, the term "target computer-based management system" is used to describe a computer-based management system to which a given data object is to be communicated.

In one example embodiment, the determining of the at least one target computer-based management systems for a give data object is according to the type of the data object. For example, if the data object is a task, the target computer-based management systems include the computer-based project management system, a common calendaring system, and a billing system. If the data object is a risk, the target computer-based management system is a risk computer-based management system. FIG. 5 shows example pseudo-code for such an embodiment for the step in 280.

According to an alternate embodiment, only one computer-based management system is used, and the step in 280 is skipped, since all data objects have the same target computer-based management system.

According to the embodiment of FIG. 8, each target computer-based management system for a given data object is recorded as a source element included in the self referent element for that data object.

The method includes in 285 communicating the structured data of the composite data message to the target computer-based management systems.

For example, FIG. 6 shows pseudo-code for communicating the data objects that make up the structured data of the composite data message to each target computer-based management system. For the purpose of the description herein the term "driver" will be used for a computer-implemented method for invoking the adding, updating and deleting of data objects in a specific external system. According to the embodiment of FIG. 6, the method includes in step 285 selecting the appropriate drivers for each target computer-based management system using those drivers to provide the data objects of the composite data message to that computer-based management system.

Furthermore, according to this embodiment, the method includes in 285 resolving the references for data objects originally included in the composite data message which have now been communicated to the target computer-based management system. Resolving references means that where a referrer data object in the composite data message refers to at least one referent, each such reference is also communicated to the computer-based management system.

For example, a computer-based management system includes a relational database for storing tasks and projects in the tables "tblTasks" and "tblProjects" respectively, and the step in 285 includes communicating data objects directly to the database. Each table has a primary key column, and the value of that column is unique for each record in that table. Furthermore, tblTasks has a foreign key column called "ProjectID", such that each record in tblTasks has a value in column ProjectID that corresponds to the primary key of the project record in tblProjects to which the task record belongs. Thus, in this example, if a composite data message includes a new task data object, the task data object comprising a reference to a project stored as a record in tblProject, then communicating the task data object to the target computer-based management system includes in 285:

storing the task data object as a new record in tblTasks; and
assigning to the ProjectID column of that new record the primary key value of the tblProjects record for the referent project.

Different computer-based management systems might store data in different forms. According to one embodiment, the computer-based management system includes a database, e.g., a relational database hosted by a relational database computer-based management system, and the method includes in 285 using database access methods—including access methods known in the art—to access that database directly and interact directly with the tables of the database used for storing the structured data of the composite data message. One example access and interacting method usable in different embodiments is Microsoft ActiveX Data Objects (ADO). Another access and interacting method usable in different embodiments is Microsoft Open Database Connectivity (ODBC).

Furthermore, in some embodiments, the computer-based management system uses an API, and the structured data is communicated to the computer-based management system by interacting with the API. For example, one embodiment includes an API implemented as what are called Distributed COM (DCOM) objects. Another embodiment includes an API implemented as .NET objects for interacting via .NET remoting. According to yet another embodiment, the computer-based management system includes an API implemented as a web service, e.g., the API is for interacting using the Simple Object Access Protocol ("SOAP") via HTTP wherein both the request to the API and the response from the API is encoded using XML format. Those skilled in the art will appreciate that there are many other embodiments for providing an appropriate API.

Communicating with Human Recipient(s)

Referring again to FIG. 3, one embodiment of the method includes in 290 communicating the free-text of the composite data message to the nominated human recipients. In one embodiment, the communicating is accomplished by sending the free-text as an electronic message, e.g., an email, instant message (IM), mobile phone text message (SMS), and/or other electronic message.

Those skilled in the art will appreciate that there are many methods for communicating an electronic message containing free-text, and any such method can be used. In one embodiment, many optional messaging methods are available for the user to select to send the free-text, e.g., by email and optionally or alternately one or both of by instant message and/or by a mobile phone text message (SMS) message. The type of electronic message for the free-text is not meant to be a limiting factor.

In one embodiment, in addition to the free-text, 290 includes communicating the structured data associated with the free-text, so that a recipient receiving the free-text, can respond to the free-text message, e.g., reply or forward, and has the associated structured data of that free-text. In one such embodiment, composite data message is communicated using email, instant messaging (IM), mobile phone text messaging (SMS), and/or other electronic messaging, wherein the message body of the electronic message includes both the free-text and the structured data in a structured text format. That structured data may be in XML, or in another form. FIG. 9 shows parts of an example email message body comprising both the free-text and structured data of a composite data message in XML format.

Those skilled in the art will appreciate that there are many prior art method for communicating messages in various formats, including textual and binary formats, and that many such methods are suitable for communicating composite data messages.

In one embodiment, rather than the structured data associated with the free-text of the composite message being sent, a indicator to the structured data is sent to the recipient with the free-text, so that the recipient can easily retrieve the structured data associated with the free-text, e.g., from the database 110 of the intended computer-based management system.

Updating Pre-existing Data Objects

By updating existing data objects includes such activities as replying or forwarding, i.e., responding to a previously received message to form a new composite data message, searching for existing data objects and editing such existing data objects, and so forth. In general, therefore, a pre-existing data object is a data object that exists, i.e., is represented by data stored in one or more computer-based management systems, e.g., as part of a database. The existing data object may or may not exist in at least one previous composite data message. The task at hand may or may not include forming a new composite data message.

Figure 7:
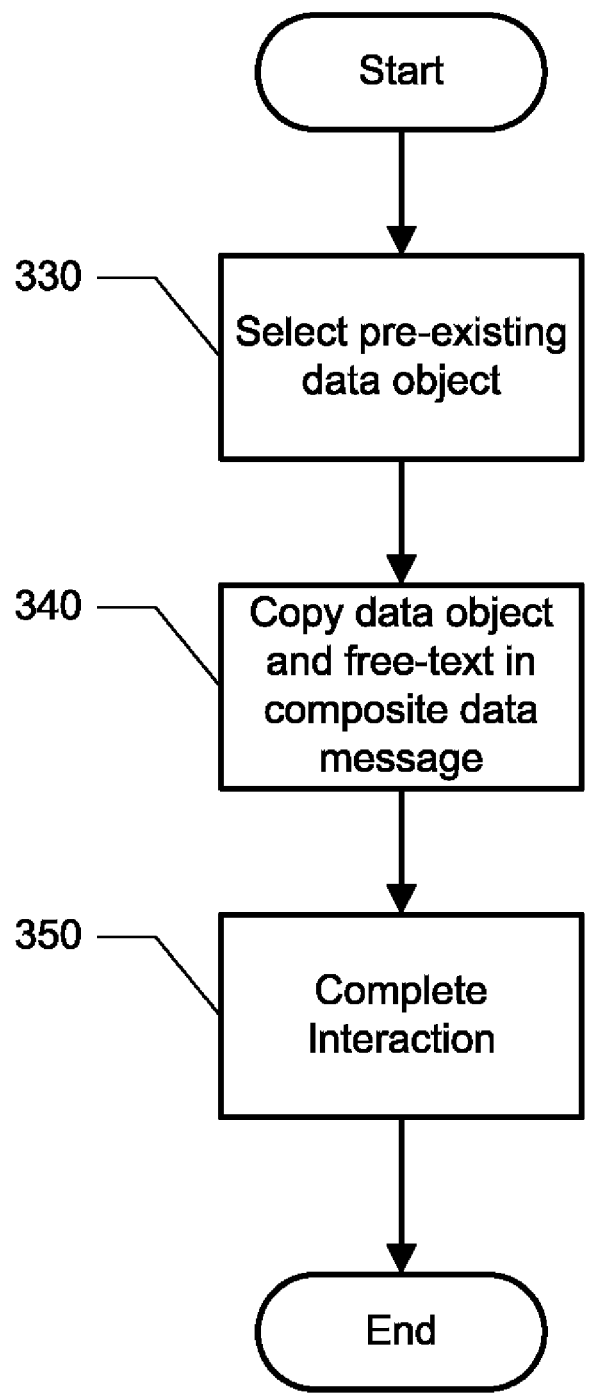
FIG. 7 shows a flowchart in simplified form for interacting with a computer-based management system so as to update pre-existing data objects.

FIG. 7 shows a simplified flowchart of a method embodiment that provides for a user acting as author to update at least one data object—each a pre-existing data object—that already exists in a computer-based management system, at least one previous composite data message, or both in a computer-based management system and at least one previous composite data message. Many of the steps in the flowchart are applicable to some but not other situations. For example, a flowchart of modifying a data object that already exists in a computer-based management system, but was not in a composite message would include steps shown in FIG. 7 that would not be shown in a flowchart of a method that provides for a user to respond to, e.g., reply to or forward a previous composite data message, and thus modify the data objects(s) of the previous composite data message, and vice versa, i.e., the flowchart of the response to the message would include steps not in the flowchart of the modifying of a pre-existing data object that was not part of a composite message. Thus, the existing data object may or may not exist in at least one previous composite data message. The task at hand may or may not include forming a new composite data message. Those in the art will understand how to modify the flowchart of FIG. 7 for a particular situation.

The method includes in 330, selecting the pre-existing data object to be updated. According to one embodiment, the selecting includes providing for the author to run a search for the data object by specifying search criteria, e.g., keywords, and selecting the data object from the generated search results.

In one embodiment applicable to the case of the pre-existing data objects being of a previously received composite message, 330 includes providing for a user to respond to, e.g., reply to or forward a previous composite data message in like manner to responding, e.g., replying to or forwarding an ordinary email, instant message (IM), mobile phone text message (SMS), and/or other electronic message. According to such an embodiment, the method includes in 330 selecting all pre-existing data objects of the composite data message being replied to. In one embodiment, a modified electronic message user interface is presented to the user in which the user can see previously received composite messages. For example, using email to illustrate, the modified email message includes an indication of any email that was part of a composite message. The user can select the email message, and indicate "reply" or "forward" in a familiar manner.

In FIG. 7, 330 includes the method of accepting a selected data object according to the user selection.

In one embodiment, the method includes in 340 generating free-text corresponding to the selected data object as the free-text of a new composite data message.

In one embodiment, the structured data of the new composite data message starts as the structured data of the selected data object. In one version, the forming of the new composite data message includes copying or otherwise using the structured data of the selected data object as the structured data of the new composite data message.

According to one embodiment, the free-text is generated using a template for representing a data object, the template appropriate to the type of the represented data object, and using the data field values of the data object. Those skilled in the art will appreciate that there are many such methods known for generating free-text from data objects, and, for example, many common text editing programs, e.g., Microsoft Word™ include a merge function—sometimes called "mail-merge" function—that merges structured data, e.g., data in a table with some pre-formed text to form free-text.

In one embodiment applicable to the case of the pre-existing data objects being of a previously received composite message, the method includes in 340 copying the original free-text corresponding to the selected data object into the new composite data message. For example, in one embodiment, as a result of the user indicating a new message is a response, e.g., a reply to or a forwarding of a previous composite data message, the free-text is generated by copying the free-text of the previous composite data message.

The method includes in 350 authoring the message by interaction with the user, and, if so selected by the user, sending the composite data message. In one embodiment, 350 includes steps that are substantially the same as 230 to 285 of the flowchart shown in FIG. 3.

In the event that the author changes the data object type of a pre-existing data object in a composite data message, the method also includes in 285 locating in each computer-based management system the one or more data structures, e.g., the one or more records, corresponding to that pre-existing data object, and deleting those corresponding data structures.

As an example, consider a risk and issue management system that uses a relational database to store records corresponding to data objects of data object types that include a risk type and an issue type. Suppose a particular risk was defined, so that there are one or more records in the database corresponding to the particular risk, and at some point in time, what was a possibility—the potential event identified as a risk—has occurred. What is needed is for the particular risk to be re-defined as an issue. In such an example, a user authors a composite data message that includes the pre-existing risk data object, and in that composite data message, changes the data object type of the object from "risk" to "issue". On communicating the structured data of this composite data message, the method includes using the self-reference of the pre-existing data object to locate the risk data structure(s), and delete these risk data structures in the database of the computer-based risk and issue management system, and adding the data object of the composite message that corresponds to what was the risk as an issue to the computer-based risk and issue management system.

In an alternate example risk computer-based management system each data object that defines potential events includes in the corresponding data structure(s), e.g., the corresponding record, a status data field that provides for indicating that the event has occurred. In such an alternate embodiment, receiving a structured message that includes an indication that the data object has changed by an event occurring includes, instead of deleting the data object, changing the status data field of that data object. Thus, in the risk example, in this case an alternate embodiment is used and the event defined as a possibility in a risk data object has occurred, receiving the structured data leads to the old risk not being deleted but simply the event of the risk marked as eventuated.

According to one alternate embodiment of the modifying of existing data objects, the recipients are communicated both the free-text and the structured data of each composite data message, and the method includes in step 330 of FIG. 7 providing for the recipient of the composite data message to select at least one specific data objects in a received composite data message for inclusion in a new composite data message. As an example, suppose an embodiment provides either a textual representation of data objects, or a representation as one or more icons, or both a textual and an iconic representation of data objects. In such an example, the user interface allows one or more textual representations or icons to be selected by the user, either individually, or as a group, so that 330 includes such selecting and the method of accepting the user selection, and in 340 the method includes the corresponding data objects of the selected object(s) to be copied to a new composite data message.

Alternative Embodiments of Authoring a Composite Data Message

Figure 10:
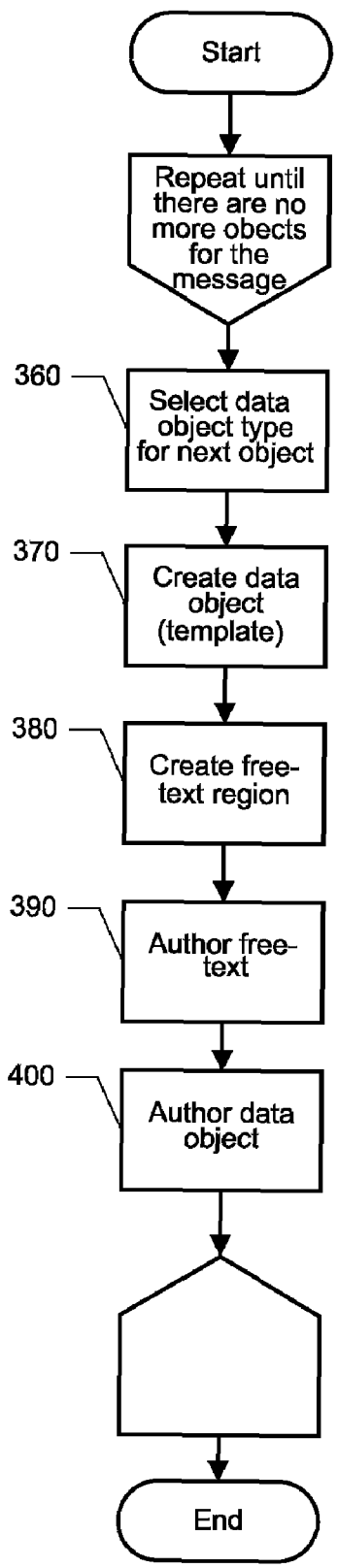
FIG. 10 shows a flowchart in simplified form for an alternate embodiment for authoring composite data messages.

Alternate embodiments exist, wherein authoring the composite data message includes other computer-assisted means for converting free-text to structured data, including non-optimal methods wherein the converting includes one or more manual steps. FIG. 10 shows a simplified flow chart of one such alternate embodiment for the step in 230 of converting free-text to structured data, where the free-text includes a plurality of free-text parts, each corresponding to a different data object. Note that each data object can have a different data object type, so that the data object types of the plurality are not necessarily the same.

In one alternate embodiment includes creating, in 360 to 400, each of a plurality of the message parts, each message part corresponding to one of the data objects.

For each of a plurality of message parts, the method includes in 360 providing a mechanism for the user to select a data object type, e.g., by displaying a user interface for the user to select a data object type. One such interface embodiment displays a list of the names of all available data object types, and provides a mechanism, e.g., a check box for the user to select a name from that list, thus selecting a data object type.

In another such alternate embodiment, the available data object types are represented by graphical representations that are displayed to the user for the authoring of the composite data message. For the purpose of the description herein, the term "icon" is used to refer to such a graphical representation. According to this embodiment, the user selects a data object type by selecting, e.g., clicking on the corresponding icon. In one version, clicking on multiple icons will set up for a message that will include a plurality of the different data object types, one for each icon selected.

Those skilled in the art will appreciate that there exist many alternate techniques for presenting a user interface that includes a mechanism for selecting one or more icons, including: embodiments providing for the user to select the icon by moving the input focus to the icon, e.g., by pressing the Tab key on the keyboard, and pressing Enter; and/or embodiments providing for the user to click-and-drag the icon to a designated area, e.g., the editable control for the display and editing of the free-text of the composite data message. Dragging a plurality of such icons will set up for a message that will include a plurality of data object types.

Note that for some embodiments, a suggested data object type is suggested once text is typed in, as described above, and the user interface is used to confirm or modify the selection.

Furthermore, according to the alternate embodiment of FIG. 10, the method includes in 370 creating a new data object, the data object according to the type selected in step 360.

One embodiment further includes in 380 presenting to the user a free-text region for entering the free-text corresponding to the data object created in 370. One such embodiment provides the free-text region by displaying an editable, visually delimited region within the free-text editing control and placing the input cursor inside the editable region. For the purpose of the description herein, the term "editable region" is used to refer to a visually delimited portion of free-text where that portion of free-text corresponds to at least one data object.

The user authors the free-text corresponding to the data object created in step 370 inside the editable region and in 390 the method accepts the input free-text. In one embodiment, the method includes shrinking or growing the editable region, e.g., vertically according to the number of lines of free-text entered so far by the user, such that the vertical extent of the editable region according to the vertical extent of the free-text in that region. The vertical window typically limited, so that at some stage, the text scrolls as more free-text is entered, as is common in the art.

One embodiment provides for the user to move the input focus between editable regions using the arrow keys on the keyboard, the mouse, and/or other techniques for moving the input cursor. Such techniques would be known to those in the art.

The method includes in 400 displaying for a user a structured data interface appropriate for the type of data. In one example, the structured data interface is a form corresponding to the type of data object is displayed, e.g., with fields to be filled in. The user enters values for the fields in the structured data interface and, also in 400, the method accepts the entered field values. For example, the names and values of the data fields are displayed using labels and editable controls respectively, such that the names and values are displayed alongside the editable region.

Figure 11:
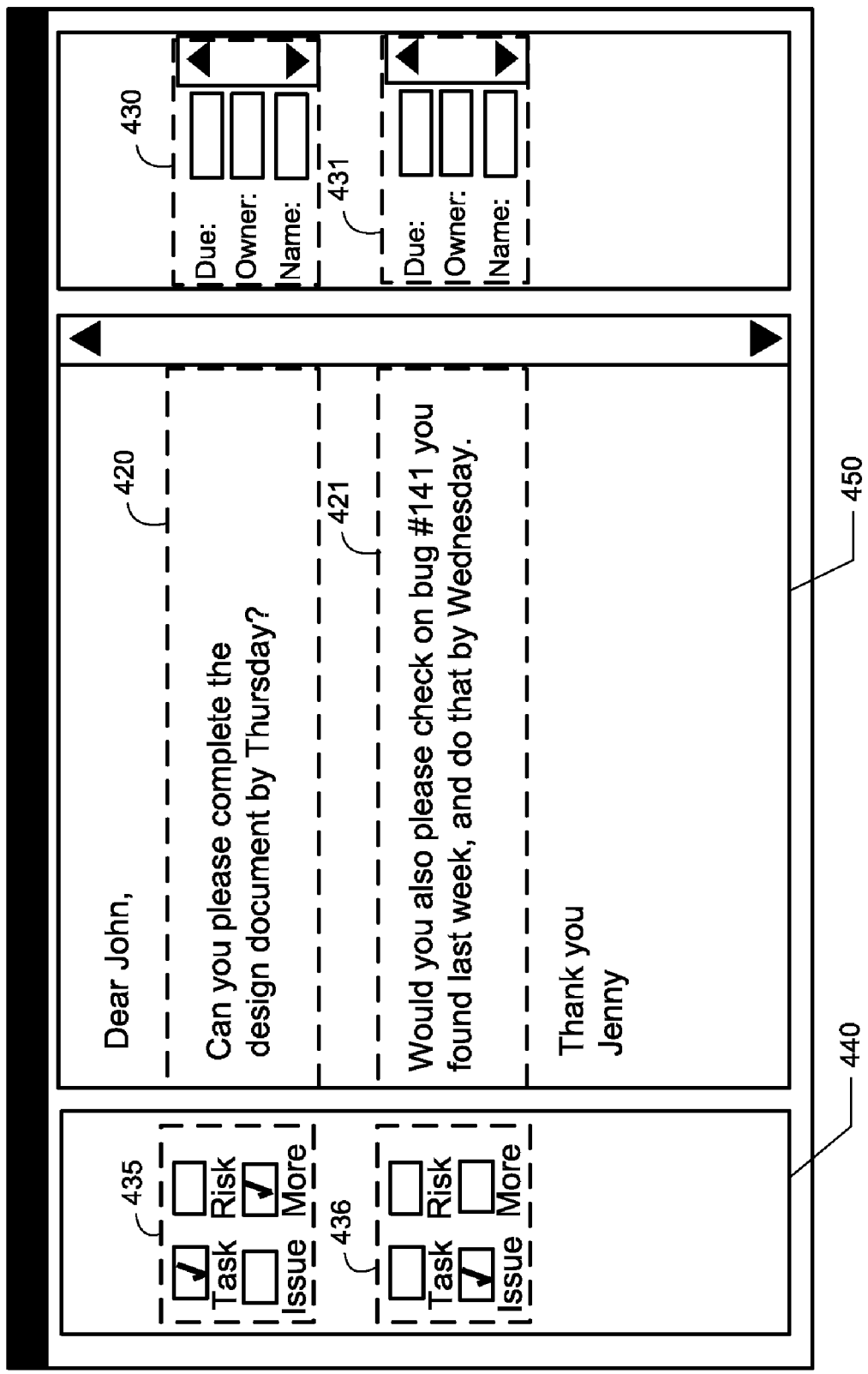
FIG. 11 shows an example user interface in simplified form for the alternate embodiment of FIG. 10.

FIG. 11 shows an example user interface according to one such alternate embodiment. Two objects are shown being authored. A sidebar 440 displays the object types. When selecting each object type, the user is given an option of indicating that there is another object. The area 435 is for the first object which is of type "task", and has "More" checked to indicate that there is another data object. The second area 436 in sidebar 440 is for the second part and is shown to be a data object of data object type "Issue." A free-text control region 450 includes editable regions for each data object. The region 450 in this example includes a first editable region 420 for the first data object and a second editable region 421 for the second object. Forms 430 and 431 are shown corresponding to the first and second object, with the form fields and their respective labels being those for the appropriate types as selected by the user, or in some embodiments, as determined from the entered free-text.

Other Alternate Embodiments of Communicating the Structured Data

Furthermore, according to another alternate embodiment of communicating the structured data, the computer-based management system provides for importing data from a pre-determined structured data format, e.g., the computer-based management system provides for importing data from a comma-delimited text file. According to this embodiment, one implementation of 285 (see FIG. 3) includes exporting the structured data of the composite data message to the structured data format required by the computer-based management system for importing. Thus, according to this embodiment, the computer-based management system need not provide an API.

According to another alternate embodiment, the method includes in 230 providing for the user author to manually select the at least one target computer-based management system for each data object in the composite data message, the selecting from a pre-determined selection of available computer-based management systems. Furthermore, according to this embodiment, the step in 280 is not implemented.

According to another alternate embodiment, the method includes in 280 providing for the author to manually select at least one target computer-based management system for the composite data message as a whole, and providing for the automatic assignment of the selected at least one target computer-based management system to each data object in the composite data message.

Furthermore, there exist alternate embodiments wherein the structured data of the composite data message is not communicated directly from the message program used to author the composite data message to the computer-based management system. According to one embodiment, the method includes in 285 communicating the structured data to a routing program, the routing program for determining the at least one target computer-based management system for receiving the structured data of the composite data message. For example, a composite data message includes both tasks and issues and is communicated to an example routing program in an organization that has separate computer-based management systems for tasks and issues respectively. The routing program communicates the task data objects to the tasks computer-based management system, and the issue data objects to the issues computer-based management system.

Those skilled in the art will appreciate that there exist embodiments, wherein the computer-based management system includes a plurality of databases, e.g., the computer-based management systems stores data using a distributed database. Furthermore, there exist computer-based management systems built according to an n-tier design, i.e., wherein the computer-based management system includes a plurality of components, the number of included components denoted by n. For example, a 3-tier computer-based management system comprising a user interface implemented as at least web page, e.g., using HTML and JavaScript, one management program and one database.

Furthermore, those skilled in the art will appreciate that there exist equivalent embodiments to the embodiments described above, such equivalent embodiments applying to computer-based management systems that include a plurality of databases and computer-based management systems that are according to an n-tier design.

According to another alternate embodiment, the computer-based management system also stores the free-text of the composite data message, and the method includes in 285 communicating both the free-text and the structured data of the composite data message to the computer-based management system.

According to yet another alternate embodiment, the computer-based management system stores its information in a file, e.g., a Microsoft Excel™ format according to a predetermined format, and the embodiment includes in 285 communicating the structured data of the composite data message by modifying the contents of the file directly, e.g., modifying the contents of an MS Excel™ file by interacting with the COM objects exposed by Microsoft Excel™.

According to another embodiment, the method includes in 290 communicating the composite data message, i.e., comprising both free-text and structured data, to a receiving message program, and further, the method includes in 285 providing for the receiving message program to communicate the structured data to at least one computer-based management system.

According to another alternate embodiment, the method includes in 285 providing for both the sending and the receiving message program to communicate the structured data of the composite data message, each to none or more computer-based management systems. For example, a user has authored and sent a composite data message to another user and the two users are working in different organizations, each organization having its own computer-based management systems. In this example, the sending message program communicates the structured data of the composite data message to each appropriate target computer-based management system of the author's organization, and the receiving message program communicates the structured data to each appropriate target computer-based management system of the recipient's organization.

Furthermore, there exist embodiments wherein a single data object is communicated to a plurality of target computer-based management systems. For example, an organization has one computer-based management system for project management, and another computer-based management system for creating invoices for customers. In this example, a task data object comprising timesheet information is communicated to the computer-based project management system and to the invoicing system.

Alternate Formation and Use of References

In embodiments where a single data object can be communicated to a plurality of computer-based management systems, the self-reference and each reference to another referent includes sufficient information for identifying each storage location of the referent, for selecting an appropriate method for accessing each storage location and for unambiguously locating the referent in each storage location. The example embodiment in FIG. 8 shows a portion of the structured data of a composite data message expressed in XML format. This example illustrates a referent that is a project, where multiple source elements are used in the reference for locating the referent in an example system named "Billing" and in an MS Project document with the access path "http://server1/CRM/ProjectPlan.mpp".

In one alternate embodiment, the authoring of composite data messages is in accordance with the method and apparatus of co-owned above-mentioned incorporated by reference U.S. patent application Ser. No. 11/457,873 to inventor Novy. In this embodiment, references are used to embody the relationships between data objects described in that patent application, and those skilled in the art will appreciate that in this case, references are created in accordance with the methods described therein.

Furthermore, those skilled in the art will appreciate that there are many alternate embodiments for the steps described in FIG. 12. For example, in one alternate embodiment, the method includes displaying a textual representation of each data object, a representation as one or more icons, or both a textual and an iconic representation of each data object of the composite data message to the author during authoring, and providing in step 470 for the user to select a referent for a given referrer by clicking-and-dragging the representation of the referent on top of the referrer.

According to another example embodiment, the step in 480 is carried out before the step of determining the assignable referents of step 460. In this embodiment, the method includes providing for the user to manually select the reference type, and limiting the selection of assignable referents in step 460 to only selecting referents allowable according to the selected reference type.

Furthermore, in another embodiment, the method provides for each data object type to be associated with a pre-determined set of none or more reference types. For example, the task data object type is associated with a reference to a responsible task owner, and a project to which the task belongs. According to this embodiment, the method includes repeating the step 240 of FIG. 3, performing one iteration for each pre-determined reference type for each data object in the composite data message. Furthermore, in this embodiment, the method also includes in step 460 of FIG. 12 limiting the selection of assignable referents to only those referents allowable according to the reference type of the current iteration.

According to yet another alternate embodiment, the method in 460 includes providing for the user to manually select the referent type first, and limiting the selection of assignable referents to only referents of the selected type.

Those skilled in the art will appreciate that there are many alternate methods known in the art for representing references in both permanent and temporary memory, for example pointers and offsets. Furthermore, there are many alternate methods known in the art for including references in structured data, for example, in one embodiment, each reference is a discrete data object comprising one pointer to the referrer and one pointer to the referent, where the reference data object is not a part of the referrer and is not a part of the referent.

Features of Using an Embodiment

The method for interacting with computer-based management systems of this invention can be used to communicate information to both computer-based management systems and human recipients by authoring composite data messages comprising both free-text and structured data. Furthermore, the invention allows a wide variety of embodiments that can be tailored to interact with many different computer-based management systems and to be usable by a wide variety of different users and user organizations.

For example, as will be appreciated by those skilled in the art, methods for converting free-text to structured data to produce composite data messages are known in the art, wherein the converting is not done interactively during the authoring of the free-text. Thus, according to such known methods, the author completes the authoring of the free-text, and the free-text is subsequently converted to structured data using a prior art method for the conversion of the free-text to the structured data.

Furthermore, embodiments may vary with respect to their user interfaces, as well as with respect to the terminology used to communicate with the user. Some embodiments provide alternate user interfaces tailored to specific hardware limitations, e.g., small screen real estate. Other embodiments provide alternate user interfaces to take advantage of specific available hardware and software features, e.g., voice recognition software systems for authoring free-text. Some embodiments vary with respect to the relative positioning of displayed components.

The user interface component used to represent the structured data will vary depending on the type of information the embodiment is designed to model.

Furthermore, as will be appreciated by those skilled in the art, embodiments exist wherein the messages authored in accordance with the invention are not immediately sent to one or more recipients and computer-based management systems. For example, the composite data message is held as a document file for an optional later transmission to at least one recipient or computer-based management system.

According to another embodiment, the author is one of the recipients of the composite data message.

Furthermore, the present invention may be implemented using any combination of computer programming software, firmware or hardware. Those skilled in the art will appreciate that embodiments exist for a wide variety of composite data message formats, including formats for transmission as an electronic message, e.g., an email, instant message (IM), mobile phone message (SMS), and/or other electronic message.

Throughout this description, the embodiments and examples shown should be considered as example, rather than as limitations of the present invention.

For example, while English was the free-text language used in the examples, the invention is applicable to text messages in any written language.

Note that the methods described herein may be coded into software.

Note also that the use of the term "data object" does not mean that the invention is restricted to being implemented by what is called object oriented programming and/or using an object-oriented language. An embodiment of the invention can be embodied in software written in whole or part using object-oriented language, or not so written.

Unless specifically stated otherwise, as apparent from the following discussions, it is appreciated that throughout the specification discussions utilizing terms such as "processing," "computing," "calculating," "determining" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data from registers and/or memory to transform that electronic data into other electronic data that may be stored in registers and/or memory. A "computer" or a "computing machine" or a "computing platform" may include one or more processors.

The methodologies described herein are, in one embodiment, performable by a machine, which includes a one or more processors that accept instructions. For any of the methods described herein, when the instructions are executed by the machine, the machine performs the method. Any machine capable of executing a set of instructions (sequential or otherwise) that specify actions to be taken by that machine are included. Thus, one a typical machine may be exemplified by a typical processing system that includes one or more processors. Example processing systems are shown in FIG. 2B. Each processor may include one or more of a CPU, a graphics processing unit, and a programmable DSP unit. The processing system further may include a memory subsystem including main RAM and/or a static RAM, and/or ROM. A bus subsystem may be included for communicating between the components. If the processing system requires a display device, such a display device may be included, e.g., a liquid crystal display (LCD) or a cathode ray tube (CRT) display. If manual data entry is required, the processing system also includes an input device such as one or more of an alphanumeric input unit such as a keyboard, a pointing device such as a mouse, and so forth. While a programs are shown in memory subsystems in FIG. 2B, those in the art will understand that all of any particular program may not be in memory at the same time, and some of the program may be in a storage subsystem. The processing system in some configurations may include a sounds output device, and a network interface device. The memory subsystem alone, or jointly with the storage subsystem thus includes a carrier medium that carries machine readable software including instructions for performing, when executed by the processing system, one of more of the methods described herein. The software may reside in the hard disk, or may also reside, completely or at least partially, within the RAM and/or within the processor during execution thereof by the computer system. Thus, the memory, the storage subsystem, and the processor also jointly constitute a tangible machine-readable carrier medium carrying instructions.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the instructions in the form of software, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer program that executes on a processing system. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries instructions for controlling a processing system to implement a method. Accordingly, embodiments of the present invention may take the form of a method, an entirely hardware embodiment, an entirely software embodiment or an embodiment combining software and hardware. Furthermore, the present invention may take the form of computer-readable carrier medium (e.g., a computer program product on a computer-readable storage medium) carrying computer-readable program instructions encoded in the medium.

The software may further be transmitted or received over a network via the network interface device. While the carrier medium is shown in an example embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by the machine and that cause the machine to perform any one or more of the methodologies of the present invention. A carrier medium may take many forms, including but not limited to, nonvolatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to include, but not be limited to, solid-state memories, optical and magnetic media, and carrier wave signals.

It will be understood that the steps of methods discussed are performed in one embodiment by an appropriate processor (or processors) of a processing (i.e., computer) system executing instructions stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

All publications, patents, and patent applications cited herein are hereby incorporated by reference.

In the claims below and the description herein, any one of the terms comprising, comprised of or which includes is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

What is claimed is:

1. A method of operating a processing system that includes one or more processors, a storage subsystem including at least memory, and a display device, the method comprising:
   (a) presenting a user interface to a human user on the display device, the user interface being for accepting a free text message;
   (b) accepting free-text from the user via the user interface into the storage subsystem;
   (c) converting the accepted free-text to form or to modify structured message components related to the accepted free-text, the structured message components stored in the storage subsystem;
   (d) presenting to the user on a structured message user interface on the display device the structured data components related to the accepted free-text, such that the user can modify or accept the structured message components;
   (e) accepting from the user the user's modification into the storage subsystem and/or acceptance of the presented structured message components until structured message components related to the accepted free-text are accepted;
   (f) repeating some or all of steps (b), (c), (d), and (e) until a composite message comprising both free-text and structured data is formed such that the structured data represents the intended meaning of the free-text in a form understandable by a computer-based management system;
   (g) storing the structured data in a data structure in the storage subsystem, and
   (h) electronically communicating the structured data of the composite message to at least one computer-based management system and, in the case that there is at least one human recipient, communicating at least the free-text of the composite message to the at least one human recipient.

2. A method as recited in claim 1, wherein at least one of the computer-based management systems is operating on a processing system remote to the processing system.

3. A method as recited in claim 1, wherein at least one of the computer-based management systems is local.

4. A method as recited in claim 1, wherein the communicating of at least the free-text of the composite message to the at least one human recipient is as an electronic message containing the at least free-text, wherein the user interface includes an electronic message user interface, and wherein the structured message user interface and the electronic message user interface are presented to the user such that the user can view both the accepted free-text and the structured data related to the accepted free-text.

5. A method as recited in claim 1,
   wherein the structured data components form one or more data objects having respective data object types and having one or more associated data structures, and
   wherein the converting includes determining the type for each data object.

6. A method as recited in claim 5, wherein determining the type for each data object includes analyzing the accepted free-text to ascertain whether one or more predefined text conditions are met.

7. A method as recited in claim 6, wherein the analyzing of the accepted free-text uses one or more keywords in the free-text.

8. A method as recited in claim 1, wherein the structured data components form one or more data objects each having one or more associated data structures, each data object having a data object type, the method further comprising:
   assigning references between data objects.

9. A method as recited in claim 1, wherein the structured data components form one or more data objects having respective data object types and having one or more associated data structures, the method further comprising assigning one or more identifiers to at least one of the data objects, such that the computer-based management system can refer to a specific data object in the composite data message by its assigned identifier.

10. A method as recited in claim 1, wherein the structured data components form one or more data objects having respective data object types and having one or more associated data structures, the method further comprising, prior to the communicating the structured data containing a specific data object, determining the at least one computer-based management system to which the specific data object is to be communicated.

11. A method as recited in claim 1,
   wherein the structured data components form one or more data objects having respective data object types and having one or more associated data structures, and wherein at least one of the data objects is a possibly modified pre-existing data object stored in the storage system, wherein the processing system includes a computer-based management system.

12. A method as recited in claim 1,
wherein the structured data components form one or more data objects having respective data object types and having one or more associated data structures, and
wherein at least one of the data objects is a possibly modified pre-existing data object that corresponds to a previous composite data message.

13. A method as recited in claim 12, wherein the communicating of at least the free-text of the composite message to the at least one human recipient is as an electronic message, wherein the free-text of the previous composite data message was received as an electronic message, wherein the method includes accepting a user input to respond to the received electronic message.

14. A method as recited in claim 13, wherein the free-text of the composite message includes the free-text of the at least one pre-existing data object in structured data of a previous composite data message.

15. A method of operating a processing system that includes one or more processors, a display device, and a storage subsystem, the method comprising:
(a) receiving from a sending user at least the free-text of a composite message that includes free-text and structured data corresponding to the free-text, wherein the structured data represents the intended meaning of the free-text in a form understandable by a computer-based management system;
(b) accepting from a human user an indication that the user desires to respond to the received composite message; and
(c) presenting to the human user one or both of the free-text of the received composite message on a free-text user interface on the display device and/or the structured data of the composite message on a structured message user interface on the display device,
such that the user can repeat the process of selectively modifying one or both of the presented free-text and/or structured data to form a new composite message to send to one or more recipients, the repeating causing modifying the text and/or structured data incrementally,
the method further comprising:
accepting from the user the user's modifying of one or both of the presented free-text and/or structured data; and
storing the accepted free-text and/or structured data as modified by the user in the storage subsystem,
wherein the received composite message includes structured data corresponding to a plurality of data objects not necessarily having the same data object type.

16. A method as recited in claim 15, wherein the receiving is of the free-text of the composite message and of information sufficient to retrieve the structured data of the composite message from an identified computer-based management system, the method further comprising retrieving the structured data from the identified computer-based management system.

17. A method as recited in claim 16, wherein the identified computer-based management system is local in the processing system.

18. A method as recited in claim 16, wherein the identified computer-based management system is on a second processing system that is coupled to the processing system via a network.

19. A method as recited in claim 15, further comprising:
forming a new composite message with new free-text and new structured data, including the user-modified free-text and/or structured data;
accepting from the user an indication of one or more human recipients;
sending at least the new free-text of the new composite message to the recipients; and
sending the new structured data to one or more computer-based management systems.

20. A method of operating a processing system that includes one or more processors, a storage subsystem including at least memory, and a display device, the method comprising:
(a) receiving from a sending user a free-text message;
(b) accepting from a user an indication that the user desires to respond to the received message;
(c) presenting to the user the free-text of the received message on a free-text user interface on the display device, the free-text user interface being for accepting a free text message;
(d) accepting at least some of the free-text from the user via the user interface into the storage subsystem, the accepting including accepting modification and/or addition to the free-text;
(e) converting the accepted free-text to form or modify structured message components related to the accepted free-text;
(f) presenting to the user on a structured message user interface on the display device the structured data components related to the accepted free-text, such that the user can modify or accept the structured message components;
(g) accepting from the user the user's modification into the storage subsystem and/or acceptance of the presented structured message components until structured message components related to the accepted—free-text are accepted;
(h) repeating some or all of steps (d), (e), (f), and (g) until a composite message comprising both free-text and structured data is formed such that the structured data represents the intended meaning of the free-text in a form understandable by a computer-based management system;
(i) storing the structured data in a data structure in the storage subsystem, and
(j) electronically communicating the structured data of the composite message to at least one computer-based management system and, in the case that there is at least one human recipient, communicating at least the free-text of the composite message to the at least one human recipient.

21. A method as recited in claim 20, wherein the communicating of at least the free-text of the composite message to the at least one human recipient is as an electronic message containing the at least free-text, wherein the user interface includes an electronic message user interface, and wherein the structured message user interface and the electronic message user interface are presented to the user such that the user can view both the accepted free-text and the structured data related to the accepted free-text.

22. A method as recited in claim 20,
wherein the structured data components form one or more data objects having respective data object types and having one or more associated data structures, and
wherein the converting includes determining the type for each data object.

23. A method as recited in claim 22, wherein determining the type for each data object includes analyzing the accepted free-text to ascertain whether one or more predefined text conditions are met.

24. A method as recited in claim 23, wherein the analyzing of the accepted free-text uses one or more keywords in the free-text.

25. A method of operating a processing system comprising one or more processors, a storage subsystem, and a display device, the method comprising:
   (a) selecting one or more data objects each having a respective data object type, each selected data object represented in structured data in a computer-based management system that is storing the structured data;
   (b) displaying data of the selected data object or objects to a human user on a user interface that includes a text user interface on the display device;
   (c) accepting free-text or a modification of free-text from the user;
   (d) converting the accepted free-text to form or modify structured message components related to the accepted free-text;
   (e) presenting to the user on a structured message user interface on the display device the structured data components related to the accepted free-text, such that the user can modify or accept the structured message components;
   (f) accepting from the user the user's modification and/or acceptance of the presented structured message components until structured message components related to the accepted—free-text are accepted;
   (g) repeating some or all of steps (a), (b) (c), (d), (e), and (f) until a composite message comprising both free-text and structured data is formed such that the structured data represents the intended meaning of the free-text in a form understandable by a computer-based management system;
   (h) storing the structured data in a data structure in the storage subsystem, and
   (i) electronically communicating the structured data of the composite message to at least one computer-based management system and, in the case that there is at least one human recipient, communicating at least the free-text of the composite message to the at least one human recipient.

26. A method as recited in claim 25, wherein the selecting includes searching.

27. A method as recited in claim 25, wherein the displayed data of the selected data object includes free-text that corresponds to the structured data of the selected data object or objects.

28. A method as recited in claim 27, further comprising generating the free-text that corresponds to the structured data of the selected data object or objects from the structured data of the data object or objects.

29. A method as recited in claim 28, wherein the generating uses one or more pre-stored template each corresponding to the respective data object type, and further uses the structured data corresponding to the respective data object.

30. A method as recited in claim 27, wherein the structured data of the composite data message includes a possibly modified version of the structured data of at least one selected data object.

31. A method as recited in claim 25, wherein the structured data of the composite data message includes a possibly modified part of the structured data of at least one selected data object.

32. A method as recited in claim 25, further comprising, in response to accepting from the user a change of the data object type of the selected data object, locating the structured data corresponding to the selected data object, and deleting those corresponding data structures.

33. A computer-readable and tangible carrier medium on which are encoded instructions that when executed by one or more processors of a processing system are operable to carry out a method comprising:
   La) presenting a user interface to a user on a the display device;
   (b) accepting free-text from the user;
   (c) converting the accepted free-text to form or to modify structured message components related to the accepted free-text;
   (d) presenting to the user on a structured message user interface on the display device the structured data components related to the accepted free-text, such that the user can modify or accept the structured message components;
   (e) accepting from the user the user's modification and/or acceptance of the presented structured message components until structured message components related to the accepted—free-text are accepted;
   (f) repeating some or all of steps (b), (c), (d), and (e) until a composite message comprising both free-text and structured data is formed such that the structured data represents the intended meaning of the free-text in a form understandable by a computer-based management system;
   (g) storing the structured data in a data structure in the storage subsystem, and
   (h) electronically communicating the structured data of the composite message to at least one computer-based management system and, in the case that there is at least one human recipient, communicating at least the free-text of the composite message to the at least one human recipient.

* * * * *

UNITED STATES PATENT AND TRADEMARK OFFICE
CERTIFICATE OF CORRECTION

PATENT NO.        : 7,669,138 B2                                                     Page 1 of 1
APPLICATION NO.   : 11/553594
DATED             : February 23, 2010
INVENTOR(S)       : Alon R. J. Novy It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 550 days.

Signed and Sealed this

Seventh Day of December, 2010

David J. Kappos
*Director of the United States Patent and Trademark Office*